(12) United States Patent
Li et al.

(10) Patent No.: US 10,440,755 B2
(45) Date of Patent: Oct. 8, 2019

(54) TERMINAL DEVICE, NETWORK DEVICE, AND DATA TRANSMISSION METHOD

(71) Applicant: Huawei Technologies Co., Ltd., Shenzhen (CN)

(72) Inventors: Mingchao Li, Beijing (CN); Yao Hua, Shenzhen (CN); Yi Shi, Beijing (CN); Guanglin Han, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 3 days.

(21) Appl. No.: 15/816,525

(22) Filed: Nov. 17, 2017

(65) Prior Publication Data

US 2018/0103490 A1    Apr. 12, 2018

Related U.S. Application Data

(63) Continuation of application No. PCT/CN2015/079216, filed on May 18, 2015.

(51) Int. Cl.
*H04W 74/08* (2009.01)
*H04W 88/02* (2009.01)
(Continued)

(52) U.S. Cl.
CPC ....... *H04W 74/085* (2013.01); *H04W 74/002* (2013.01); *H04W 88/02* (2013.01); *H04W 4/046* (2013.01); *H04W 4/70* (2018.02)

(58) Field of Classification Search
CPC . H04W 74/085; H04W 74/002; H04W 88/02; H04W 4/70; H04W 4/046
See application file for complete search history.

(56) References Cited

U.S. PATENT DOCUMENTS

| 2003/0050068 A1 | 3/2003 | Woxberg et al. |
| 2007/0225044 A1* | 9/2007 | Law .................... H04W 74/002 455/562.1 |

(Continued)

FOREIGN PATENT DOCUMENTS

| CN | 101018362 A | 8/2007 |
| CN | 101841791 A | 9/2010 |

(Continued)

OTHER PUBLICATIONS

"D2D Communication Resource Scheduling," 3GPP TSG-RAN WG1 Meeting #76, Prague, Czech Republic, R1-140589, 3rd Generation Parrtership Project, Valbonne, France (Feb. 10-14, 2014).

(Continued)

*Primary Examiner* — Afshawn M Towfighi
(74) *Attorney, Agent, or Firm* — Leydig, Voit & Mayer, Ltd.

(57) ABSTRACT

The embodiments of the present invention disclose a data transmission method. A specific solution is as follows: A processor sends, by using a first resource block, a first MAC PDU that carries a first reservation indicator field used to instruct to reserve the first resource block; a receiver receives a second MAC PDU sent by using a second resource block by a set of second terminal devices, where the second MAC PDU carries a first resource feedback field used to indicate that the first resource block is successfully reserved; a processor determines, according to the first resource feedback field and that is sent by a second terminal device in the set of second terminal devices, that the first resource block is a resource block used to send a new MAC PDU; and the transmitter sends the new MAC PDU by using the first resource block.

12 Claims, 10 Drawing Sheets

(51) Int. Cl.
*H04W 74/00* (2009.01)
*H04W 4/70* (2018.01)
*H04W 4/04* (2009.01)

(56) References Cited

U.S. PATENT DOCUMENTS

| | | |
|---|---|---|
| 2012/0077510 A1 | 3/2012 | Chen et al. |
| 2013/0308549 A1 | 11/2013 | Madan et al. |
| 2014/0112163 A1* | 4/2014 | Park .................... H04W 72/005 370/252 |
| 2014/0328329 A1 | 11/2014 | Novlan et al. |

FOREIGN PATENT DOCUMENTS

| | | |
|---|---|---|
| CN | 103222294 A | 7/2013 |
| CN | 104322125 A | 1/2015 |
| EP | 2866503 A1 | 4/2015 |
| JP | 2016502305 A | 1/2016 |
| WO | 2012159270 A1 | 11/2012 |
| WO | 2014062478 A1 | 4/2014 |
| WO | 2014121442 A1 | 8/2014 |

OTHER PUBLICATIONS

"MAC PDU format," 3GPP TSG-RAN Meeting #59bis, Shanghai, China, Tdoc R2-074263, 3rd Generation Partnership Project, Valbonne, France (Oct. 8-12, 2007).

"3rd Generation Partnership Project; Technical Specification Group Radio Access Network; Evolved Universal Terrestrial Radio Access (E-UTRA); Medium Access Control (MAC) protocol specification (Release 11)," 3GPP TS 36.321 V11.6.0, 3rd Generation Partnership Project, Valbonne, France (Mar. 2015).

* cited by examiner

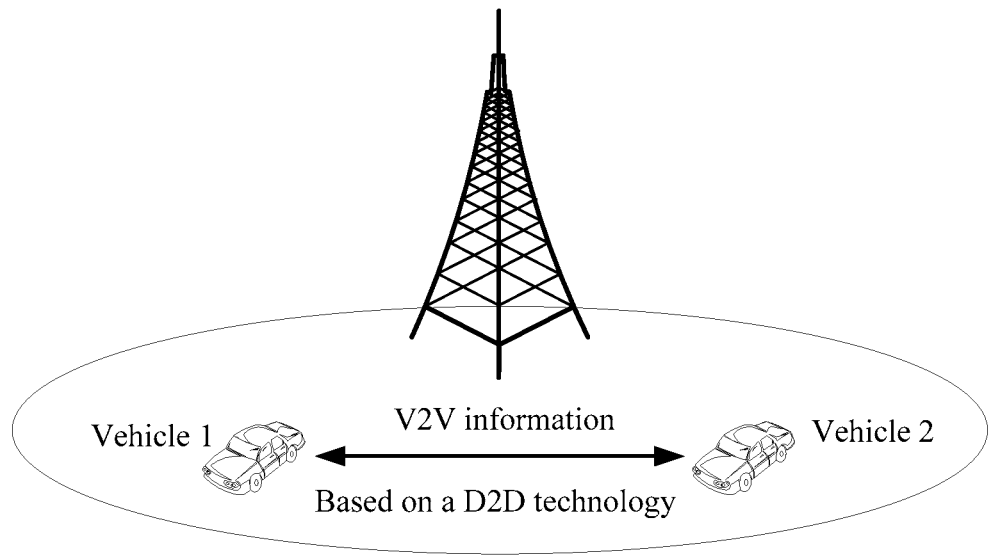
FIG. 3
| Source ID | Destination ID | Dedicated MAC subheader | Payload |
FIG. 4
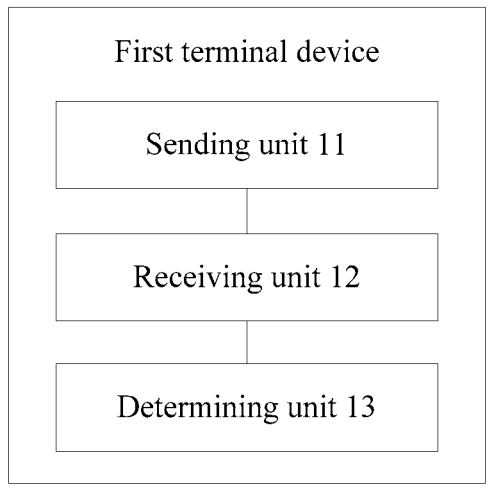
FIG. 5

TERMINAL DEVICE, NETWORK DEVICE, AND DATA TRANSMISSION METHOD

CROSS-REFERENCE TO RELATED APPLICATIONS

This application is a continuation of International Application No. PCT/CN2015/079216, filed on May 18, 2015, the disclosure of which is hereby incorporated by reference in its entirety.

TECHNICAL FIELD

The embodiments of the present invention relate to the communications field, and in particular, to a terminal device, a network device, and a data transmission method.

BACKGROUND

As the society continuously develops, vehicles are becoming more popular. Driving facilitates people's travel, but also causes some adverse impact such as frequent traffic accidents. To reduce a traffic accident occurrence probability, a vehicle may obtain, by means of vehicle to vehicle (V2V) communication, V2V information that is broadcast by another vehicle and that includes a vehicle speed, a driving direction, a specific location, information about whether an emergency brake is applied, and the like; and learn about road condition information according to the obtained V2V information. In this case, a driver can better perceive a traffic condition beyond the visual field according to the obtained road condition information, so as to predetermine and avoid, in a timely manner, a danger.

It is well known that Long Term Evolution (LTE) is currently a mainstream wireless communications technology. A device-to-device (D2D) technology is considered as an important feature and standardized. The D2D technology supports direct communication between terminal devices. Therefore, V2V information may be transmitted between vehicles by using the D2D technology. Specifically, when transmitting V2V information by using the D2D technology, a vehicle first needs to randomly select a resource block from a resource pool, and then transmits, by using the selected resource block, the V2V information that needs to be transmitted.

The conventional art has at least the following problems: When V2V information is transmitted by using a D2D technology, a vehicle uses a free contention mechanism in which random selection is performed, that is, randomly selects, from a resource pool, a resource block as a resource required to send the V2V information. However, in this mechanism, multiple neighboring vehicles may select a same resource block for sending V2V information of the multiple neighboring vehicles. Consequently, transmission resource collision is caused, and another vehicle cannot successfully obtain, by means of demodulation, V2V information sent by a vehicle. In addition, the transmission resource collision is even more serious as there are more vehicles. This causes a problem of relatively low transmission efficiency.

SUMMARY

The present invention provides a terminal device, a network device, and a data transmission method, so as to resolve a problem of relatively low transmission efficiency that is caused by transmission resource collision.

According to a first aspect of the present invention, a first terminal device is provided, including:

a sending unit, configured to send a first Media Access Control MAC protocol data unit PDU by using a first resource block, where the first MAC PDU carries a first reservation indicator field, so as to instruct the first terminal device to reserve the first resource block;

a receiving unit, configured to receive a second MAC PDU sent by using a second resource block by a set of second terminal devices, where the set of second terminal devices includes at least one second terminal device, and the second MAC PDU carries a first resource feedback field, so as to indicate that the first resource block is successfully reserved; and a determining unit, configured to determine, according to the first resource feedback field that is received by the receiving unit and that is sent by the second terminal device in the set of second terminal devices, that the first resource block used by the sending unit to send the first MAC PDU is a resource block used to send a new MAC PDU; where the sending unit is further configured to send the new MAC PDU by using the first resource block determined by the determining unit.

With reference to the first aspect, in a possible implementation, the second MAC PDU received by the receiving unit further carries a second reservation indicator field, so as to instruct the second terminal device to reserve the second resource block.

With reference to the first aspect or the foregoing possible implementation, in another possible implementation, the first resource feedback field carried in the second MAC PDU received by the receiving unit is used to indicate that the first resource block is not successfully reserved;

the determining unit is further configured to determine, from a contention resource pool according to the first resource feedback field and the second reservation indicator field that are received by the receiving unit, a new resource block as the resource block used to send the new MAC PDU, where the first resource feedback field is sent by the second terminal device in the set of second terminal devices, and the second reservation indicator field is sent by all the second terminal devices in the set of second terminal devices; and the sending unit is further configured to send the new MAC PDU by using the new resource block determined by the determining unit.

With reference to the first aspect or the foregoing possible implementation, in another possible implementation, the first terminal device further includes:

an obtaining unit, configured to obtain configuration information before the sending unit sends the first Media Access Control MAC protocol data unit PDU by using the first resource block, where the configuration information includes reservation indication information; where the determining unit is further configured to determine a timing time of a timer according to the reservation indication information obtained by the obtaining unit, where the timing time is duration in which the first terminal device reserves the first resource block; and a starting unit, configured to start the timer when the sending unit sends the first MAC PDU by using the first resource block; where the determining unit is specifically configured to: when the timer started by the starting unit does not stop timing, determine, according to the first resource feedback field that is received by the receiving unit and that is sent by the second terminal device in the set of second terminal devices, that the first resource block used by the sending unit to send the first MAC PDU is the resource block used to send the new MAC PDU.

With reference to the first aspect or the foregoing possible implementation, in another possible implementation, the determining unit is specifically configured to: when the timer started by the starting unit stops timing, determine, from a contention resource pool according to the first resource feedback field and the second reservation indicator field that are received by the receiving unit, a new resource block as the resource block used to send the new MAC PDU, where the first resource feedback field is sent by the second terminal device in the set of second terminal devices, and the second reservation indicator field is sent by all the second terminal devices in the set of second terminal devices.

With reference to the first aspect or the foregoing possible implementation, in another possible implementation, the first terminal device further includes:

an obtaining unit, configured to obtain configuration information before the sending unit sends the first Media Access Control MAC protocol data unit PDU by using the first resource block, where the configuration information includes reservation indication information; where the determining unit is further configured to determine a timing time of a timer according to the reservation indication information obtained by the obtaining unit, where the timing time is duration in which the first terminal device reserves the first resource block; and a starting unit, configured to start the timer when the sending unit sends the first MAC PDU by using the first resource block; where the determining unit is specifically configured to: when the timer started by the starting unit stops timing or when the timer started by the starting unit does not stop timing, determine, from the contention resource pool according to the first resource feedback field and the second reservation indicator field that are received by the receiving unit, the new resource block as the resource block used to send the new MAC PDU, where the first resource feedback field is sent by the second terminal device in the set of second terminal devices, and the second reservation indicator field is sent by all the second terminal devices in the set of second terminal devices.

With reference to the first aspect or the foregoing possible implementations, in another possible implementation, the reservation indication information obtained by the obtaining unit includes reservation duration indication information, so as to indicate reservable duration or a reservable duration range; and the determining unit is specifically configured to:

when the reservation duration indication information obtained by the obtaining unit is used to indicate the reservable duration, determine, according to the reservation duration indication information obtained by the obtaining unit, that the reservable duration is the timing time of the timer; or when the reservation duration indication information obtained by the obtaining unit is used to indicate the reservable duration range, determine, according to the reservation duration indication information obtained by the obtaining unit, that any duration within the reservable duration range is the timing time of the timer.

With reference to the first aspect or the foregoing possible implementation, in another possible implementation, the first terminal device further includes:

an obtaining unit, configured to obtain configuration information before the sending unit sends the first Media Access Control MAC protocol data unit PDU by using the first resource block, where the configuration information includes reservation indication information; where the determining unit is further configured to determine reservation duration according to the reservation indication information obtained by the obtaining unit, where the reservation duration is duration in which the first terminal device reserves the first resource block;

the first reservation indicator field carried in the first MAC PDU sent by the sending unit is further used to indicate a time parameter, the time parameter is greater than or equal to 0, and the time parameter is used to indicate the reservation duration; and the determining unit is specifically configured to: when the time parameter is not 0, determine, according to the first resource feedback field that is received by the receiving unit and that is sent by the second terminal device in the set of second terminal devices, that the first resource block used by the sending unit to send the first MAC PDU is the resource block used to send the new MAC PDU.

With reference to the first aspect or the foregoing possible implementation, in another possible implementation, the determining unit is specifically configured to: when the time parameter is 0, determine, from a contention resource pool according to the first resource feedback field and the second reservation indicator field that are received by the receiving unit, a new resource block as the resource block used to send the new MAC PDU, where the first resource feedback field is sent by the second terminal device in the set of second terminal devices, and the second reservation indicator field is sent by all the second terminal devices in the set of second terminal devices.

With reference to the first aspect or the foregoing possible implementation, in another possible implementation, the first terminal device further includes:

an obtaining unit, configured to obtain configuration information before the sending unit sends the first Media Access Control MAC protocol data unit PDU by using the first resource block, where the configuration information includes reservation indication information; where the determining unit is further configured to determine reservation duration according to the reservation indication information obtained by the obtaining unit, where the reservation duration is duration in which the first terminal device reserves the first resource block;

the first reservation indicator field carried in the first MAC PDU sent by the sending unit is further used to indicate a time parameter, the time parameter is greater than or equal to 0, and the time parameter is used to indicate the reservation duration; and the determining unit is specifically configured to: when the time parameter is 0 or when the time parameter is not 0, determine, from the contention resource pool according to the first resource feedback field and the second reservation indicator field that are received by the receiving unit, the new resource block as the resource block used to send the new MAC PDU, where the first resource feedback field is sent by the second terminal device in the set of second terminal devices, and the second reservation indicator field is sent by all the second terminal devices in the set of second terminal devices.

With reference to the first aspect or the foregoing possible implementations, in another possible implementation, the first terminal device further includes:

a configuration unit, configured to configure, according to the reservation duration determined by the determining unit, the first reservation indicator field before the sending unit sends the first Media Access Control MAC protocol data unit PDU by using the first resource block.

With reference to the first aspect or the foregoing possible implementations, in another possible implementation, the reservation indication information obtained by the obtaining unit includes reservation duration indication information, so as to indicate reservable duration or a reservable duration range; or the reservation indication information obtained by the obtaining unit includes the reservation duration indication information and information that carries a reservation indicator field length; and the determining unit is specifically configured to:

if the reservation indication information obtained by the obtaining unit includes the reservation duration indication information and the reservation duration indication information is used to indicate the reservable duration, determine, according to the reservation duration indication information obtained by the obtaining unit, that the reservable duration is the reservation duration; or if the reservation indication information obtained by the obtaining unit includes the reservation duration indication information and the reservation duration indication information is used to indicate the reservable duration range, determine, according to the reservation duration indication information obtained by the obtaining unit, that any duration within the reservable duration range is the reservation duration; or if the reservation indication information obtained by the obtaining unit includes the reservation duration indication information and the information that carries the reservation indicator field length, determine the reservation duration according to the reservation duration indication information and the information that carries the reservation indicator field length that are obtained by the obtaining unit.

With reference to the first aspect or the foregoing possible implementations, in another possible implementation, the first terminal device further includes:

a monitoring unit, configured to monitor the contention resource pool before the sending unit sends the first Media Access Control MAC protocol data unit PDU by using the first resource block; where the determining unit is further configured to determine a second resource feedback field according to a reservation status that is of a resource block in the contention resource pool and that is obtained by the monitoring unit by means of monitoring, where the second resource feedback field is used to indicate the reservation status of the resource block in the contention resource pool before the first MAC PDU is sent; and the first MAC PDU sent by the sending unit by using the first resource block further carries the second resource feedback field.

With reference to the first aspect or the foregoing possible implementation, in another possible implementation, the configuration information obtained by the obtaining unit further includes resource feedback information; and the determining unit is specifically configured to generate the second resource feedback field according to the resource feedback information obtained by the obtaining unit and the reservation status that is of the resource block in the contention resource pool and that is obtained by the monitoring unit by means of monitoring.

With reference to the first aspect or the foregoing possible implementation, in another possible implementation, the resource feedback information obtained by the obtaining unit includes information about a condition for carrying a resource feedback field and/or information that carries a resource feedback field length; and the determining unit is specifically configured to:

when the resource feedback information obtained by the obtaining unit includes the information about the condition for carrying a resource feedback field, when it is determined that the information that is about the condition for carrying a resource feedback field and that is obtained by the obtaining unit is met, generate the second resource feedback field according to preset information that carries a resource feedback field length and according to the reservation status that is of the resource block in the contention resource pool and that is obtained by the monitoring unit by means of monitoring; or when the resource feedback information obtained by the obtaining unit includes the information that carries the resource feedback field length, generate the second resource feedback field according to the information that carries the resource feedback field length and that is included in the resource feedback information obtained by the obtaining unit and according to the reservation status that is of the resource block in the contention resource pool and that is obtained by the monitoring unit by means of monitoring; or when the resource feedback information obtained by the obtaining unit includes the information about the condition for carrying a resource feedback field and the information that carries the resource feedback field length, when it is determined that the information that is about the condition for carrying a resource feedback field and that is obtained by the obtaining unit is met, generate the second resource feedback field according to the information that carries the resource feedback field length and that is included in the resource feedback information obtained by the obtaining unit and according to the reservation status that is of the resource block in the contention resource pool and that is obtained by the monitoring unit by means of monitoring.

With reference to the first aspect or the foregoing possible implementations, in another possible implementation, the obtaining unit is specifically configured to: obtain the pre-configured configuration information, or receive the configuration information sent by a network device.

With reference to the first aspect or the foregoing possible implementations, in another possible implementation, the first reservation indicator field is included in a MAC header of the first MAC PDU sent by the sending unit; and the MAC header further includes an extension indicator field, so as to indicate whether the first MAC PDU carries the second resource feedback field, and when the extension indicator field indicates that the first MAC PDU carries the second resource feedback field, the second resource feedback field is included in the MAC header of the first MAC PDU sent by the sending unit.

With reference to the first aspect or the foregoing possible implementations, in another possible implementation, when the first MAC PDU sent by the sending unit carries the first reservation indicator field, the first reservation indicator field is included in a payload field of the first MAC PDU sent by the sending unit, and a MAC header of the first MAC PDU sent by the sending unit includes a MAC subheader, so as to indicate that data corresponding to the MAC subheader is the first reservation indicator field; or when the first MAC PDU sent by the sending unit carries the first reservation indicator field and the second resource feedback field, the first reservation indicator field and the second resource feedback field are included in a payload field of the first MAC PDU sent by the sending unit, and a MAC header of the first MAC PDU sent by the sending unit includes a MAC subheader, so as to indicate that data corresponding to the MAC subheader is the first reservation indicator field and the second resource feedback field.

According to a second aspect of the present invention, a network device is provided, including:

a sending unit, configured to send configuration information to a first terminal device, where the configuration information includes reservation indication information.

With reference to the second aspect, in a possible implementation, the reservation indication information sent by the sending unit includes reservation duration indication information, so as to indicate reservable duration or a reservable duration range; or the reservation indication information sent by the sending unit includes the reservation duration indication information and information that carries a reservation indicator field length.

With reference to the second aspect or the foregoing possible implementation, in another possible implementation, the configuration information sent by the sending unit further includes resource feedback information, and the resource feedback information includes information about a condition for carrying a resource feedback field and/or information that carries a resource feedback field length.

With reference to the second aspect or the foregoing possible implementations, in another possible implementation, the sending unit is specifically configured to send the configuration information to the first terminal device by using system information or radio resource control RRC signaling.

According to a third aspect of the present invention, a data transmission method is provided, including:

sending, by a first terminal device, a first Media Access Control MAC protocol data unit PDU by using a first resource block, where the first MAC PDU carries a first reservation indicator field, so as to instruct the first terminal device to reserve the first resource block;

receiving, by the first terminal device, a second MAC PDU sent by using a second resource block by a set of second terminal devices, where the set of second terminal devices includes at least one second terminal device, and the second MAC PDU carries a first resource feedback field, so as to indicate that the first resource block is successfully reserved;

determining, by the first terminal device according to the first resource feedback field sent by the second terminal device in the set of second terminal devices, that the first resource block is a resource block used to send a new MAC PDU; and sending, by the first terminal device, the new MAC PDU by using the first resource block.

With reference to the third aspect, in a possible implementation, the second MAC PDU further carries a second reservation indicator field, so as to instruct the second terminal device to reserve the second resource block.

With reference to the third aspect or the foregoing possible implementation, in another possible implementation, the first resource feedback field is used to indicate that the first resource block is not successfully reserved, and the method further includes:

determining, by the first terminal device from a contention resource pool according to the first resource feedback field sent by the second terminal device in the set of second terminal devices and the second reservation indicator field sent by all the second terminal devices in the set of second terminal devices, a new resource block as the resource block used to send the new MAC PDU; and sending, by the first terminal device, the new MAC PDU by using the new resource block.

With reference to the third aspect or the foregoing possible implementation, in another possible implementation, before the sending, by a first terminal device, a first Media Access Control MAC protocol data unit PDU by using a first resource block, the method further includes:

obtaining, by the first terminal device, configuration information, where the configuration information includes reservation indication information;

determining, by the first terminal device, a timing time of a timer according to the reservation indication information, where the timing time is duration in which the first terminal device reserves the first resource block; and starting, by the first terminal device, the timer when the first terminal device sends the first MAC PDU by using the first resource block; and the determining, by the first terminal device according to the first resource feedback field sent by the second terminal device in the set of second terminal devices, that the first resource block is a resource block used to send a new MAC PDU includes:

when the timer does not stop timing, determining, by the first terminal device according to the first resource feedback field sent by the second terminal device in the set of second terminal devices, that the first resource block is the resource block used to send the new MAC PDU.

With reference to the third aspect or the foregoing possible implementation, in another possible implementation, the method further includes:

when the timer stops timing, determining, by the first terminal device from a contention resource pool according to the first resource feedback field sent by the second terminal device in the set of second terminal devices and the second reservation indicator field sent by all the second terminal devices in the set of second terminal devices, a new resource block as the resource block used to send the new MAC PDU.

With reference to the third aspect or the foregoing possible implementation, in another possible implementation, before the sending, by a first terminal device, a first Media Access Control MAC protocol data unit PDU by using a first resource block, the method further includes:

obtaining, by the first terminal device, configuration information, where the configuration information includes reservation indication information;

determining, by the first terminal device, a timing time of a timer according to the reservation indication information, where the timing time is duration in which the first terminal device reserves the first resource block; and starting, by the first terminal device, the timer when the first terminal device sends the first MAC PDU by using the first resource block; and the determining, by the first terminal device from a contention resource pool according to the first resource feedback field sent by the second terminal device in the set of second terminal devices and the second reservation indicator field sent by all the second terminal devices in the set of second terminal devices, a new resource block as the resource block used to send the new MAC PDU includes:

when the timer stops timing or when the timer does not stop timing, determining, by the first terminal device from the contention resource pool according to the first resource feedback field sent by the second terminal device in the set of second terminal devices and the second reservation indicator field sent by all the second terminal devices in the set of second terminal devices, the new resource block as the resource block used to send the new MAC PDU.

With reference to the third aspect or the foregoing possible implementations, in another possible implementation, the reservation indication information includes reservation duration indication information, so as to indicate reservable duration or a reservable duration range; and the determining, by the first terminal device, a timing time of a timer according to the reservation indication information includes:

when the reservation duration indication information is used to indicate the reservable duration, determining, by the first terminal device according to the reservation duration indication information, that the reservable duration is the timing time of the timer; or when the reservation duration indication information is used to indicate the reservable duration range, determining, by the first terminal device according to the reservation duration indication information, that any duration within the reservable duration range is the timing time of the timer.

With reference to the third aspect or the foregoing possible implementation, in another possible implementation, before the sending, by a first terminal device, a first Media Access Control MAC protocol data unit PDU by using a first resource block, the method further includes:

obtaining, by the first terminal device, configuration information, where the configuration information includes reservation indication information; and determining, by the first terminal device, reservation duration according to the reservation indication information, where the reservation duration is duration in which the first terminal device reserves the first resource block; where the first reservation indicator field is further used to indicate a time parameter, the time parameter is greater than or equal to 0, and the time parameter is used to indicate the reservation duration; and the determining, by the first terminal device according to the first resource feedback field sent by the second terminal device in the set of second terminal devices, that the first resource block is a resource block used to send a new MAC PDU includes:

when the time parameter is not 0, determining, by the first terminal device according to the first resource feedback field sent by the second terminal device in the set of second terminal devices, that the first resource block is the resource block used to send the new MAC PDU.

With reference to the third aspect or the foregoing possible implementation, in another possible implementation, the method further includes:

when the time parameter is 0, determining, by the first terminal device from a contention resource pool according to the first resource feedback field sent by the second terminal device in the set of second terminal devices and the second reservation indicator field sent by all the second terminal devices in the set of second terminal devices, a new resource block as the resource block used to send the new MAC PDU.

With reference to the third aspect or the foregoing possible implementation, in another possible implementation, before the sending, by a first terminal device, a first Media Access Control MAC protocol data unit PDU by using a first resource block, the method further includes:

obtaining, by the first terminal device, configuration information, where the configuration information includes reservation indication information; and determining, by the first terminal device, reservation duration according to the reservation indication information, where the reservation duration is duration in which the first terminal device reserves the first resource block; where the first reservation indicator field is further used to indicate a time parameter, the time parameter is greater than or equal to 0, and the time parameter is used to indicate the reservation duration; and the determining, by the first terminal device from a contention resource pool according to the first resource feedback field sent by the second terminal device in the set of second terminal devices and the second reservation indicator field sent by all the second terminal devices in the set of second terminal devices, a new resource block as the resource block used to send the new MAC PDU includes:

when the time parameter is 0 or when the time parameter is not 0, determining, by the first terminal device from the contention resource pool according to the first resource feedback field sent by the second terminal device in the set of second terminal devices and the second reservation indicator field sent by all the second terminal devices in the set of second terminal devices, the new resource block as the resource block used to send the new MAC PDU.

With reference to the third aspect or the foregoing possible implementations, in another possible implementation, before the sending, by a first terminal device, a first Media Access Control MAC protocol data unit PDU by using a first resource block, the method further includes:

configuring, by the first terminal device, the first reservation indicator field according to the reservation duration.

With reference to the third aspect or the foregoing possible implementations, in another possible implementation, the reservation indication information includes reservation duration indication information, so as to indicate reservable duration or a reservable duration range; or the reservation indication information includes the reservation duration indication information and information that carries a reservation indicator field length; and the determining, by the first terminal device, reservation duration according to the reservation indication information includes:

if the reservation indication information includes the reservation duration indication information and the reservation duration indication information is used to indicate the reservable duration, determining, by the first terminal device according to the reservation duration indication information, that the reservable duration is the reservation duration; or if the reservation indication information includes the reservation duration indication information and the reservation duration indication information is used to indicate the reservable duration range, determining, by the first terminal device according to the reservation duration indication information, that any duration within the reservable duration range is the reservation duration; or if the reservation indication information includes the reservation duration indication information and the information that carries the reservation indicator field length, determining, by the first terminal device, the reservation duration according to the reservation duration indication information and the information that carries the reservation indicator field length.

With reference to the third aspect or the foregoing possible implementations, in another possible implementation, before the sending, by a first terminal device, a first Media Access Control MAC protocol data unit PDU by using a first resource block, the method further includes:

monitoring, by the first terminal device, the contention resource pool; and determining, by the first terminal device, a second resource feedback field according to a reservation status that is of a resource block in the contention resource pool and that is obtained by means of monitoring, where the second resource feedback field is used to indicate the reservation status of the resource block in the contention resource pool before the first MAC PDU is sent; where the first MAC PDU sent by the first terminal device by using the first resource block further carries the second resource feedback field.

With reference to the third aspect or the foregoing possible implementation, in another possible implementation, the configuration information further includes resource feedback information; and the determining a second resource feedback field according to a reservation status that is of a resource block in the contention resource pool and that is obtained by means of monitoring includes:

generating, by the first terminal device, the second resource feedback field according to the resource feedback information and the reservation status that is of the resource block in the contention resource pool and that is obtained by means of monitoring.

With reference to the third aspect or the foregoing possible implementation, in another possible implementation, the resource feedback information includes information about a condition for carrying a resource feedback field and/or information that carries a resource feedback field length; and the generating, by the first terminal device, the second resource feedback field according to the resource feedback information and the reservation status that is of the resource block in the contention resource pool and that is obtained by means of monitoring includes:

when the resource feedback information includes the information about the condition for carrying a resource feedback field, when determining that the information about the condition for carrying a resource feedback field is met, generating, by the first terminal device, the second resource feedback field according to preset information that carries a resource feedback field length and according to the reservation status that is of the resource block in the contention resource pool and that is obtained by means of monitoring; or when the resource feedback information includes the information that carries the resource feedback field length, generating, by the first terminal device, the second resource feedback field according to the information that carries the resource feedback field length and that is included in the resource feedback information and according to the reservation status that is of the resource block in the contention resource pool and that is obtained by means of monitoring; or when the resource feedback information includes the information about the condition for carrying a resource feedback field and the information that carries the resource feedback field length, when determining that the information about the condition for carrying a resource feedback field is met, generating, by the first terminal device, the second resource feedback field according to the information that carries the resource feedback field length and that is included in the resource feedback information and according to the reservation status that is of the resource block in the contention resource pool and that is obtained by means of monitoring.

With reference to the third aspect or the foregoing possible implementations, in another possible implementation, the obtaining, by the first terminal device, configuration information includes:

obtaining, by the first terminal device, the pre-configured configuration information; or receiving, by the first terminal device, the configuration information sent by a network device.

With reference to the third aspect or the foregoing possible implementations, in another possible implementation, the first reservation indicator field is included in a MAC header of the first MAC PDU; and the MAC header further includes an extension indicator field, so as to indicate whether the first MAC PDU carries the second resource feedback field, and when the extension indicator field indicates that the first MAC PDU carries the second resource feedback field, the second resource feedback field is included in the MAC header of the first MAC PDU.

With reference to the third aspect or the foregoing possible implementations, in another possible implementation, when the first MAC PDU carries the first reservation indicator field, the first reservation indicator field is included in a payload field of the first MAC PDU, and a MAC header of the first MAC PDU includes a MAC subheader, so as to indicate that data corresponding to the MAC subheader is the first reservation indicator field; or when the first MAC PDU carries the first reservation indicator field and the second resource feedback field, the first reservation indicator field and the second resource feedback field are included in a payload field of the first MAC PDU, and a MAC header of the first MAC PDU includes a MAC subheader, so as to indicate that data corresponding to the MAC subheader is the first reservation indicator field and the second resource feedback field.

According to a fourth aspect of the present invention, a data transmission method is provided, including:

sending, by a network device, configuration information to a first terminal device, where the configuration information includes reservation indication information.

With reference to the fourth aspect, in a possible implementation, the reservation indication information includes reservation duration indication information, so as to indicate reservable duration or a reservable duration range; or the reservation indication information includes the reservation duration indication information and information that carries a reservation indicator field length.

With reference to the fourth aspect or the foregoing possible implementation, in another possible implementation, the configuration information further includes resource feedback information, and the resource feedback information includes information about a condition for carrying a resource feedback field and/or information that carries a resource feedback field length.

With reference to the fourth aspect or the foregoing possible implementations, in another possible implementation, the sending, by a network device, configuration information to a first terminal device includes:

sending, by the network device, the configuration information to the first terminal device by using system information or radio resource control RRC signaling.

According to the terminal device, the network device, and the data transmission method provided in the embodiments of the present invention, the first terminal device sends, by using the first resource block, the first MAC PDU that carries the first reservation indicator field used to instruct to reserve the first resource block; then, after receiving the second MAC PDU that is sent by the set of second terminal devices by using the second resource block and that carries the first resource feedback field used to indicate that the first resource block is successfully reserved, determines, according to the first resource feedback field carried in the second MAC PDU sent by the second terminal device in the set of second terminal devices, that the first resource block is the resource block used to send the new MAC PDU; and sends the new MAC PDU by using the first resource block. When reserving the first resource block according to an instruction of the first reservation indicator field, and determining, according to a resource feedback field carried in a received MAC PDU sent by another terminal device, that the first resource block is successfully reserved, that is, no resource collision occurs, the first terminal device continues to use the first resource block to transmit the new MAC PDU. Therefore, a transmission resource collision rate is effectively reduced, and transmission efficiency is improved.

BRIEF DESCRIPTION OF DRAWINGS

To describe the technical solutions in the embodiments of the present invention or in the conventional art more clearly, the following briefly describes the accompanying drawings required for describing the embodiments or the conventional art. Apparently, the accompanying drawings in the following description show merely some embodiments of the present invention, and a person of ordinary skill in the art may still derive other drawings from these accompanying drawings without creative efforts.

FIG. 3 is a schematic diagram of communication performed between vehicles by using a D2D technology;

FIG. 4 is a schematic diagram of a format of a Media Access Control protocol data unit according to the conventional art;

FIG. 5 is a schematic composition diagram of a first terminal device according to an embodiment of the present invention;

FIG. 6 is a schematic composition diagram of another first terminal device according to an embodiment of the present invention;

DESCRIPTION OF EMBODIMENTS

Figure 1:
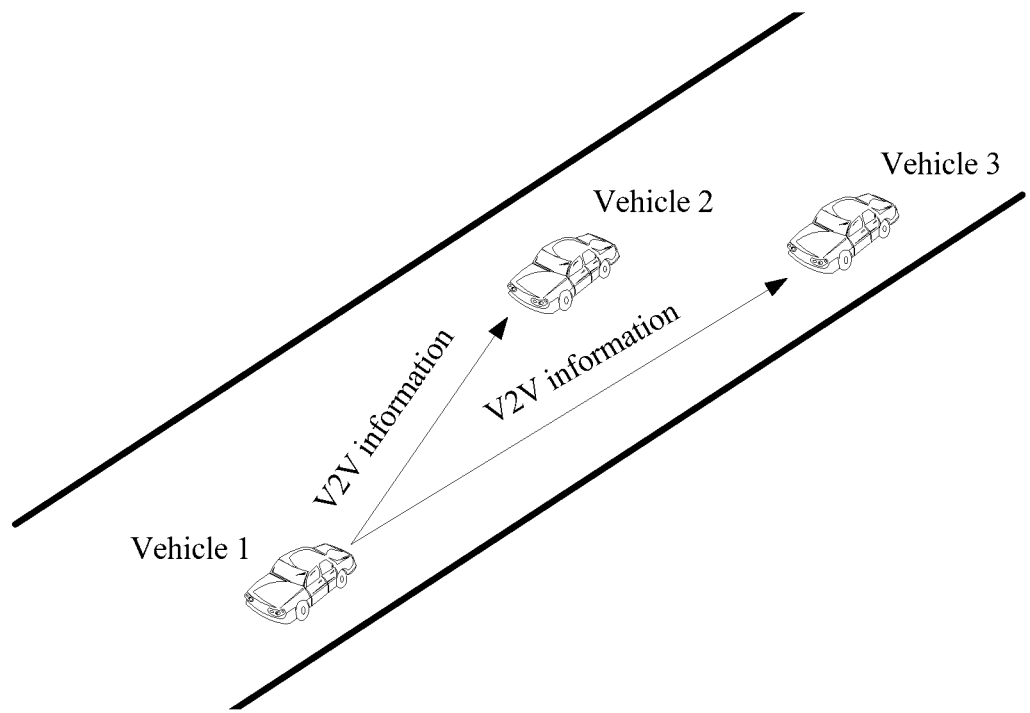
FIG. 1 is a schematic diagram of communication performed between vehicles by using a V2V technology.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Technologies described in this specification may be applied to various communications systems, for example, current 2G and 3G communications systems and a next-generation communications system, such as a Global System for Mobile Communications (GSM) system, a Code Division Multiple Access (CDMA) system, a Time Division Multiple Access (TDMA) system, a Wideband Code Division Multiple Access (WCDMA) system, a Frequency Division Multiple Access (FDMA) system, an orthogonal frequency division multiple access (OFDMA) system, a single carrier FDMA (SC-FDMA) system, a general packet radio service (GPRS) system, a Long Term Evolution (LTE) system, and other similar communications systems.

Various aspects are described in this specification with reference to a terminal and/or a base station and/or a base station node.

User equipment may be a wireless terminal or a wired terminal. The wireless terminal may be a device that provides a user with voice and/or data connectivity, a handheld device with a radio connection function, or another processing device connected to a wireless modem. The wireless terminal may communicate with one or more core networks by using a radio access network (RAN). The wireless terminal may be a mobile terminal, such as a mobile phone (or referred to as a "cellular" phone) or a computer with a mobile terminal. For example, the wireless terminal may be a portable, pocket-sized, handheld, computer built-in, or in-vehicle mobile apparatus, which exchanges voice and/or data with the radio access network. For example, the wireless terminal is a device such as a personal communications service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile, a remote station, an access point, a remote terminal, an access terminal, a user terminal, a user agent, or user equipment (UE).

The base station (for example, an access point) may be a device that is in an access network and that communicates, over an air interface, with the wireless terminal by using one or more sectors. The base station may be configured to mutually convert a received over-the-air frame and an IP packet and serve as a router between the wireless terminal and a remaining part of the access network. The remaining part of the access network may include an Internet Protocol (IP) network. The base station may further coordinate attribute management of the air interface. For example, the base station may be a base transceiver station (BTS) in GSM or CDMA, may be a NodeB in WCDMA, or may be an evolved NodeB in LTE. This is not limited in this application.

In addition, the terms "system" and "network" in this specification may be used interchangeably in this specification.

Currently, to reduce a traffic accident occurrence probability, by means of V2V communication, a vehicle may obtain road condition information or receive an information service in a timely manner. As shown in FIG. 1, a specific process of obtaining road condition information by a vehicle is as follows: A vehicle 1 broadcasts, by means of V2V communication, V2V information such as a vehicle speed, a driving direction, a specific location, and information about whether an emergency brake is applied. In this case, vehicles around the vehicle 1, that is, a vehicle 2 and a vehicle 3, may receive the V2V information that is broadcast by the vehicle 1. After successfully receiving the V2V information that is broadcast by the vehicle 1, the vehicle 2 and the vehicle 3 may learn about road condition information according to the V2V information of the vehicle 1 such as the vehicle speed, the driving direction, the specific location, and the information about whether the emergency brake is applied. In this case, a driver may predetermine and avoid, in a timely manner, a danger according to the road condition information, so as to avoid a traffic accident. V2V information transmitted between vehicles by means of V2V communication is referred to as basic safety message (BSM) in a wireless access in vehicular environments (WAVE) protocol in the United States, and is referred to as cooperative awareness messages (CAM) or a decentralized environmental notification message (DEMN) in an Intelligent Transportation System (ITS) in Europe.

Figure 2:
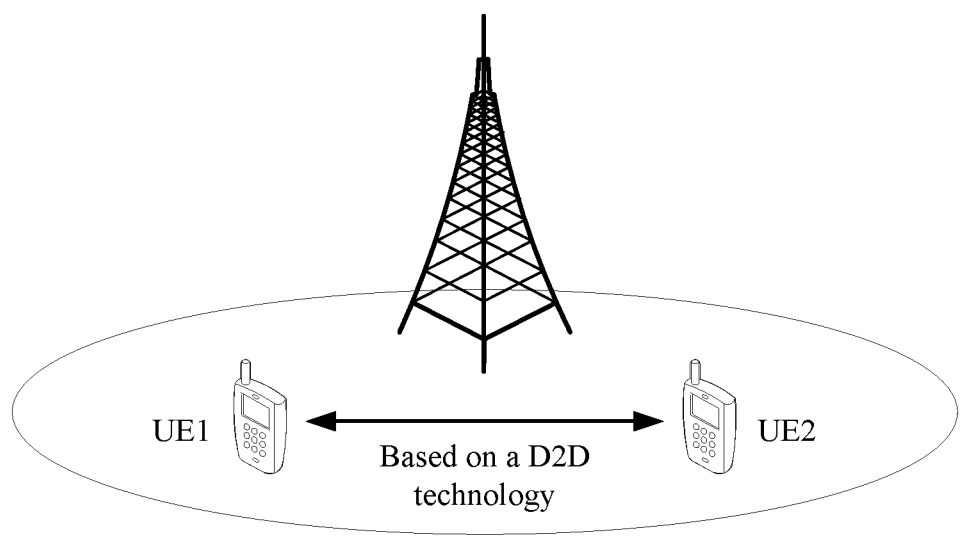
FIG. 2 is a schematic diagram of communication performed between user equipments by using a D2D technology.

LTE is currently a mainstream wireless communications technology, and a D2D technology in the LTE supports direct communication between terminal devices (for example, direct communication between UE1 and UE2 shown in FIG. 2). The V2V communication also belongs to direct communication between devices. Therefore, as shown in FIG. 3, V2V information may be transmitted by using the D2D technology.

It is well known that D2D technologies may be classified into two technologies: D2D discovery and D2D communication, and each of the two technologies has a distributed transmission mode. A distributed transmission mode of the D2D discovery is referred to as a D2D discovery type (type) 1, and a distributed transmission mode of the D2D communication is referred to as a D2D communication mode 2. Generally, in the distributed transmission mode, network resources are grouped into one or more resource pools. When a terminal device needs to transmit data, the terminal device sends data by using a free contention mechanism in which random sending is performed, that is, the terminal device needs to randomly select, from a resource pool, a resource block for transmitting data.

For example, in the D2D communication mode 2 of the D2D communication technology, a vehicle 1 needs to transmit V2V information. In the mode, network resources are grouped into a scheduling assignment (SA) resource pool and a data resource pool. For example, in an application scenario shown in FIG. 3, a specific process of sending the V2V information by the vehicle 1 is as follows: When generating the V2V information, the vehicle 1 first randomly selects, from the SA resource pool, an SA resource block for broadcasting SA information. The SA information is used to indicate a time-frequency resource location in the data resource pool and a modulation and coding scheme. The time-frequency resource location indicated by the SA information is also randomly selected by the vehicle 1 from the data resource pool. Then, the vehicle 1 broadcasts the generated V2V information in the corresponding time-frequency resource location in the data resource pool according to the modulation and coding scheme indicated by the SA information. In this case, if a vehicle around the vehicle 1, for example, a vehicle 2, finds, by means of searching the SA resource pool, the SA information that is broadcast by the vehicle 1 and performs successful decoding, the vehicle 2 may receive, according to the time-frequency resource location that is in the data resource pool and that is indicated by the SA information, the V2V information that is broadcast by the vehicle 1; and perform decoding according to the modulation and coding scheme indicated by the SA information, so as to successfully receive the V2V information that is broadcast by the vehicle 1. The V2V information sent by the vehicle 1 is specifically included in a Media Access Control (MAC) protocol data unit (PDU). A format of the MAC PDU is shown in FIG. 4. A source identifier (ID) field is used to indicate an ID of a transmit end (such as the vehicle 1). A destination ID field is used to indicate an ID of a receive end, for example, may be used to indicate an ID of a group, or may be used to indicate an ID of a type of services. Certainly, the destination ID field may be ignored for sending in a broadcast manner. A typical MAC subheader (dedicate MAC sub-headers) field is used to indicate data included in a payload field. The payload (payload) field includes the data, and the V2V information is included in the payload field.

It can be learned from the above that when V2V information is transmitted by using a D2D technology, a vehicle uses a free contention mechanism in which random sending is performed. In this mechanism, multiple neighboring vehicles may select a same time-frequency resource for sending V2V information of the multiple neighboring vehicles. For example, in an application scenario shown in FIG. 1, both a vehicle 2 and a vehicle 3 select a time-frequency resource 1 for sending V2V information of the vehicle 2 and the vehicle 3. Consequently, transmission resource collision is caused, and another vehicle (for example, a vehicle 1) cannot successfully obtain, by means of demodulation, the V2V information sent by the vehicle 2 and the vehicle 3. This causes a problem of relatively low transmission efficiency. A data transmission method provided in the present invention can be used to well resolve the foregoing problem.

To facilitate understanding of a person skilled in the art, the present invention describes, by using the following embodiments, a specific implementation process of the technical solutions provided in the present invention.

It should be noted that a terminal device described in the present invention may be a device such as UE or a vehicle. The embodiments of the present invention set no specific limitation on the terminal device.

An embodiment of the present invention provides a first terminal device. As shown in FIG. 5, the first terminal device may include: a sending unit 11, a receiving unit 12, and a determining unit 13.

The sending unit 11 is configured to send a first Media Access Control MAC protocol data unit PDU by using a first resource block, where the first MAC PDU carries a first reservation indicator field, so as to instruct the first terminal device to reserve the first resource block.

The receiving unit 12 is configured to receive a second MAC PDU sent by using a second resource block by a set of second terminal devices, where the set of second terminal devices includes at least one second terminal device, and the second MAC PDU carries a first resource feedback field, so as to indicate that the first resource block is successfully reserved.

The determining unit 13 is configured to determine, according to the first resource feedback field that is received by the receiving unit 12 and that is sent by the second terminal device in the set of second terminal devices, that the first resource block used by the sending unit 11 to send the first MAC PDU is a resource block used to send a new MAC PDU.

The sending unit 11 is further configured to send the new MAC PDU by using the first resource block determined by the determining unit 13.

In this embodiment of the present invention, further, the second MAC PDU received by the receiving unit 12 further carries a second reservation indicator field, so as to instruct the second terminal device to reserve the second resource block.

In this embodiment of the present invention, further, the first resource feedback field carried in the second MAC PDU received by the receiving unit 12 is used to indicate that the first resource block is not successfully reserved.

The determining unit 13 is further configured to determine, from a contention resource pool according to the first resource feedback field and the second reservation indicator field that are received by the receiving unit 12, a new resource block as the resource block used to send the new MAC PDU, where the first resource feedback field is sent by the second terminal device in the set of second terminal devices, and the second reservation indicator field is sent by all the second terminal devices in the set of second terminal devices.

The sending unit 11 is further configured to send the new MAC PDU by using the new resource block determined by the determining unit 13.

In this embodiment of the present invention, further, as shown in FIG. 6, the first terminal device may further include an obtaining unit 14 and a starting unit 15.

The obtaining unit 14 is configured to obtain configuration information before the sending unit 11 sends the first Media Access Control MAC protocol data unit PDU by using the first resource block, where the configuration information includes reservation indication information.

The determining unit 13 is further configured to determine a timing time of a timer according to the reservation indication information obtained by the obtaining unit 14, where the timing time is duration in which the first terminal device reserves the first resource block.

The starting unit 15 is configured to start the timer when the sending unit 11 sends the first MAC PDU by using the first resource block.

The determining unit 13 is specifically configured to: when the timer started by the starting unit 15 does not stop timing, determine, according to the first resource feedback field that is received by the receiving unit 12 and that is sent by the second terminal device in the set of second terminal devices, that the first resource block used by the sending unit 11 to send the first MAC PDU is the resource block used to send the new MAC PDU.

In this embodiment of the present invention, further, the determining unit 13 is specifically configured to: when the timer started by the starting unit 15 stops timing, determine, from a contention resource pool according to the first resource feedback field and the second reservation indicator field that are received by the receiving unit 12, a new resource block as the resource block used to send the new MAC PDU, where the first resource feedback field is sent by the second terminal device in the set of second terminal devices, and the second reservation indicator field is sent by all the second terminal devices in the set of second terminal devices.

In this embodiment of the present invention, further, as shown in FIG. 6, the first terminal device may further include an obtaining unit 14 and a starting unit 15.

The obtaining unit 14 is configured to obtain configuration information before the sending unit 11 sends the first Media Access Control MAC protocol data unit PDU by using the first resource block, where the configuration information includes reservation indication information.

The determining unit 13 is further configured to determine a timing time of a timer according to the reservation indication information obtained by the obtaining unit 14, where the timing time is duration in which the first terminal device reserves the first resource block.

The starting unit 15 is configured to start the timer when the sending unit 11 sends the first MAC PDU by using the first resource block.

The determining unit 13 is specifically configured to: when the timer started by the starting unit 15 stops timing or when the timer started by the starting unit 15 does not stop timing, determine, from the contention resource pool according to the first resource feedback field and the second reservation indicator field that are received by the receiving unit 12, the new resource block as the resource block used to send the new MAC PDU, where the first resource feedback field is sent by the second terminal device in the set of second terminal devices, and the second reservation indicator field is sent by all the second terminal devices in the set of second terminal devices.

In this embodiment of the present invention, further, the reservation indication information obtained by the obtaining unit 14 includes reservation duration indication information, so as to indicate reservable duration or a reservable duration range.

The determining unit 13 is specifically configured to: when the reservation duration indication information obtained by the obtaining unit 14 is used to indicate the reservable duration, determine, according to the reservation duration indication information obtained by the obtaining unit 14, that the reservable duration is the timing time of the timer; or when the reservation duration indication information obtained by the obtaining unit 14 is used to indicate the reservable duration range, determine, according to the reservation duration indication information obtained by the obtaining unit 14, that any duration within the reservable duration range is the timing time of the timer.

In this embodiment of the present invention, further, as shown in FIG. 6, the first terminal device may further include an obtaining unit 14.

The obtaining unit 14 is configured to obtain configuration information before the sending unit 11 sends the first Media Access Control MAC protocol data unit PDU by using the first resource block, where the configuration information includes reservation indication information.

The determining unit 13 is further configured to determine reservation duration according to the reservation indication information obtained by the obtaining unit 14, where the reservation duration is duration in which the first terminal device reserves the first resource block.

The first reservation indicator field carried in the first MAC PDU sent by the sending unit 11 is further used to indicate a time parameter, the time parameter is greater than or equal to 0, and the time parameter is used to indicate the reservation duration.

The determining unit 13 is specifically configured to: when the time parameter is not 0, determine, according to the first resource feedback field that is received by the receiving unit 12 and that is sent by the second terminal device in the set of second terminal devices, that the first resource block used by the sending unit 11 to send the first MAC PDU is the resource block used to send the new MAC PDU.

In this embodiment of the present invention, further, the determining unit 13 is specifically configured to: when the time parameter is 0, determine, from a contention resource pool according to the first resource feedback field and the second reservation indicator field that are received by the receiving unit 12, a new resource block as the resource block used to send the new MAC PDU, where the first resource feedback field is sent by the second terminal device in the set of second terminal devices, and the second reservation indicator field is sent by all the second terminal devices in the set of second terminal devices.

In this embodiment of the present invention, further, as shown in FIG. 6, the first terminal device may further include an obtaining unit 14.

The obtaining unit 14 is configured to obtain configuration information before the sending unit 11 sends the first Media Access Control MAC protocol data unit PDU by using the first resource block, where the configuration information includes reservation indication information.

The determining unit 13 is further configured to determine reservation duration according to the reservation indication information obtained by the obtaining unit 14, where the reservation duration is duration in which the first terminal device reserves the first resource block.

The first reservation indicator field carried in the first MAC PDU sent by the sending unit 11 is further used to indicate a time parameter, the time parameter is greater than or equal to 0, and the time parameter is used to indicate the reservation duration.

The determining unit 13 is specifically configured to: when the time parameter is 0 or when the time parameter is not 0, determine, from the contention resource pool according to the first resource feedback field and the second reservation indicator field that are received by the receiving unit 12, the new resource block as the resource block used to send the new MAC PDU, where the first resource feedback field is sent by the second terminal device in the set of second terminal devices, and the second reservation indicator field is sent by all the second terminal devices in the set of second terminal devices.

In this embodiment of the present invention, further, the first terminal device may further include a configuration unit 16.

The configuration unit 16 is configured to configure, according to the reservation duration determined by the determining unit 13, the first reservation indicator field before the sending unit 11 sends the first Media Access Control MAC protocol data unit PDU by using the first resource block.

In this embodiment of the present invention, further, the reservation indication information obtained by the obtaining unit 14 includes reservation duration indication information, so as to indicate reservable duration or a reservable duration range; or the reservation indication information obtained by the obtaining unit 14 includes the reservation duration indication information and information that carries a reservation indicator field length.

The determining unit 13 is specifically configured to: if the reservation indication information obtained by the obtaining unit 14 includes the reservation duration indication information and the reservation duration indication information is used to indicate the reservable duration, determine, according to the reservation duration indication information obtained by the obtaining unit 14, that the reservable duration is the reservation duration; or if the reservation indication information obtained by the obtaining unit 14 includes the reservation duration indication information and the reservation duration indication information is used to indicate the reservable duration range, determine, according to the reservation duration indication information obtained by the obtaining unit 14, that any duration within the reservable duration range is the reservation duration; or if the reservation indication information obtained by the obtaining unit 14 includes the reservation duration indication information and the information that carries the reservation indicator field length, determine the reservation duration according to the reservation duration indication information and the information that carries the reservation indicator field length that are obtained by the obtaining unit 14.

In this embodiment of the present invention, further, the first terminal device may further include a monitoring unit 17.

The monitoring unit 17 is configured to monitor the contention resource pool before the sending unit 11 sends the first Media Access Control MAC protocol data unit PDU by using the first resource block.

The determining unit 13 is further configured to determine a second resource feedback field according to a reservation status that is of a resource block in the contention resource pool and that is obtained by the monitoring unit 17 by means of monitoring, where the second resource feedback field is used to indicate the reservation status of the resource block in the contention resource pool before the first MAC PDU is sent.

The first MAC PDU sent by the sending unit 11 by using the first resource block further carries the second resource feedback field.

In this embodiment of the present invention, further, the configuration information obtained by the obtaining unit 14 further includes resource feedback information.

The determining unit 13 is specifically configured to generate the second resource feedback field according to the resource feedback information obtained by the obtaining unit 14 and the reservation status that is of the resource block in the contention resource pool and that is obtained by the monitoring unit 17 by means of monitoring.

In this embodiment of the present invention, further, the resource feedback information obtained by the obtaining unit 14 includes information about a condition for carrying a resource feedback field and/or information that carries a resource feedback field length.

The determining unit 13 is specifically configured to: when the resource feedback information obtained by the obtaining unit 14 includes the information about the condition for carrying a resource feedback field, when it is determined that the information that is about the condition for carrying a resource feedback field and that is obtained by the obtaining unit 14 is met, generate the second resource feedback field according to preset information that carries a resource feedback field length and according to the reservation status that is of the resource block in the contention resource pool and that is obtained by the monitoring unit 17 by means of monitoring; or when the resource feedback information obtained by the obtaining unit 14 includes the information that carries the resource feedback field length, generate the second resource feedback field according to the information that carries the resource feedback field length and that is included in the resource feedback information obtained by the obtaining unit 14 and according to the reservation status that is of the resource block in the contention resource pool and that is obtained by the monitoring unit 17 by means of monitoring; or when the resource feedback information obtained by the obtaining unit 14 includes the information about the condition for carrying a resource feedback field and the information that carries the resource feedback field length, when it is determined that the information that is about the condition for carrying a resource feedback field and that is obtained by the obtaining unit 14 is met, generate the second resource feedback field according to the information that carries the resource feedback field length and that is included in the resource feedback information obtained by the obtaining unit 14 and according to the reservation status that is of the resource block in the contention resource pool and that is obtained by the monitoring unit 17 by means of monitoring.

In this embodiment of the present invention, further, the obtaining unit 14 is specifically configured to: obtain the pre-configured configuration information, or receive the configuration information sent by a network device.

In this embodiment of the present invention, further, the first reservation indicator field is included in a MAC header of the first MAC PDU sent by the sending unit 11. The MAC header further includes an extension indicator field, so as to indicate whether the first MAC PDU carries the second resource feedback field, and when the extension indicator field indicates that the first MAC PDU carries the second resource feedback field, the second resource feedback field is included in the MAC header of the first MAC PDU sent by the sending unit 11.

In this embodiment of the present invention, further, when the first MAC PDU sent by the sending unit 11 carries the first reservation indicator field, the first reservation indicator field is included in a payload field of the first MAC PDU sent by the sending unit 11, and a MAC header of the first MAC PDU sent by the sending unit 11 includes a MAC subheader, so as to indicate that data corresponding to the MAC subheader is the first reservation indicator field; or when the first MAC PDU sent by the sending unit 11 carries the first reservation indicator field and the second resource feedback field, the first reservation indicator field and the second resource feedback field are included in a payload field of the first MAC PDU sent by the sending unit 11, and a MAC header of the first MAC PDU sent by the sending unit 11 includes a MAC subheader, so as to indicate that data corresponding to the MAC subheader is the first reservation indicator field and the second resource feedback field.

In this embodiment of the present invention, further, the configuration information obtained by the obtaining unit 14 further includes information about the contention resource pool.

The first terminal device may further include a selection unit 18, configured to: after the obtaining unit 14 obtains the configuration information, select, from the contention resource pool, a resource block as the first resource block according to the information that is about the contention resource pool and that is obtained by the obtaining unit 14.

The first terminal device provided in this embodiment of the present invention sends, by using the first resource block, the first MAC PDU that carries the first reservation indicator field used to instruct to reserve the first resource block; then, after receiving the second MAC PDU that is sent by the set of second terminal devices by using the second resource block and that carries the first resource feedback field used to indicate that the first resource block is successfully reserved, determines, according to the first resource feedback field carried in the second MAC PDU sent by the second terminal device in the set of second terminal devices, that the first resource block is the resource block used to send the new MAC PDU; and sends the new MAC PDU by using the first resource block. When reserving the first resource block according to an instruction of the first reservation indicator field, and determining, according to a resource feedback field carried in a received MAC PDU sent by another terminal device, that the first resource block is successfully reserved, that is, no resource collision occurs, the first terminal device continues to use the first resource block to transmit the new MAC PDU; or when determining, according to a resource feedback field carried in a received MAC PDU sent by another terminal device, that the first resource block is not successfully reserved, that is, resource collision occurs, the first terminal device selects a new resource block to transmit the new MAC PDU. Therefore, a transmission resource collision rate is effectively reduced, and transmission efficiency is improved.

In addition, the first resource block is reserved by using the duration that is determined according to the reservation indication information in the configuration information and in which the first terminal device may reserve the first resource block, so that a terminal device is prevented from keeping using a particular resource block, and network resources are allocated fairly.

Figure 7:
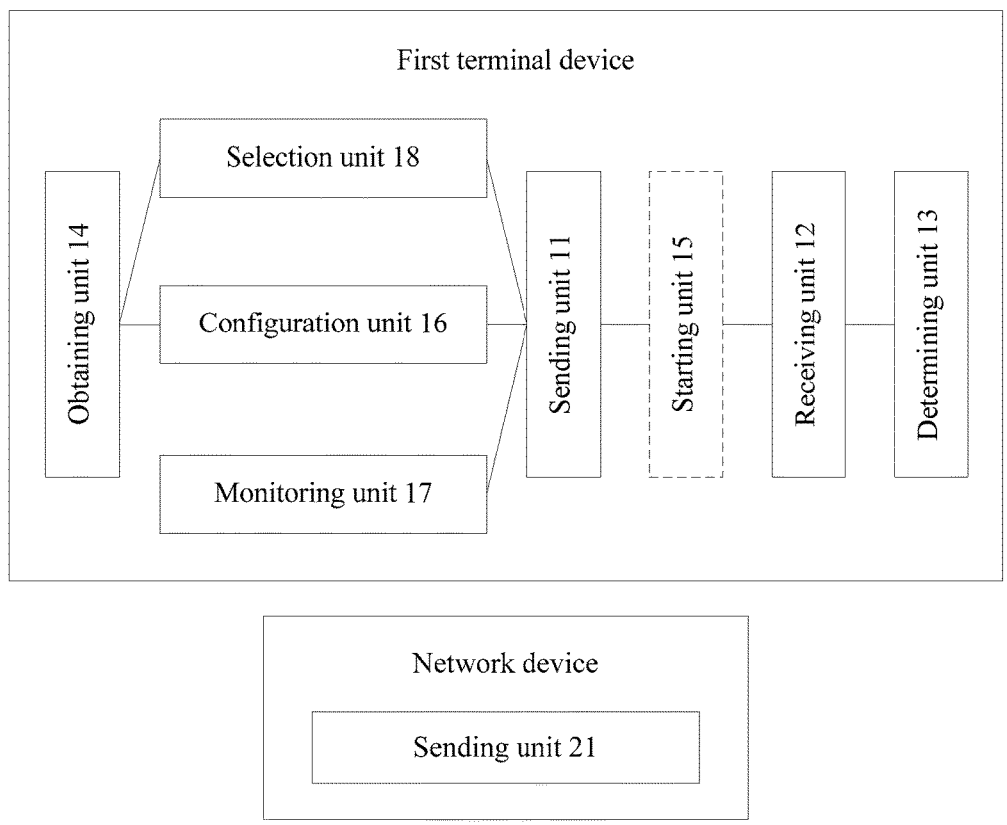
FIG. 7 is a schematic composition diagram of a network device according to another embodiment of the present invention.

Another embodiment of the present invention provides a network device. As shown in FIG. 7, the network device includes a sending unit 21.

The sending unit 21 is configured to send configuration information to a first terminal device, where the configuration information includes reservation indication information.

In this embodiment of the present invention, further, the reservation indication information sent by the sending unit 21 includes reservation duration indication information, so as to indicate reservable duration or a reservable duration range; or the reservation indication information sent by the sending unit 21 includes the reservation duration indication information and information that carries a reservation indicator field length.

In this embodiment of the present invention, further, the configuration information sent by the sending unit 21 further includes resource feedback information, and the resource feedback information includes information about a condition for carrying a resource feedback field and/or information that carries a resource feedback field length.

In this embodiment of the present invention, further, the sending unit 21 is specifically configured to send the configuration information to the first terminal device by using system information or radio resource control RRC signaling.

In this embodiment of the present invention, further, the configuration information sent by the sending unit 21 further includes information about a contention resource pool.

The network device provided in this embodiment of the present invention sends the configuration information that includes the reservation indication information to the first terminal device. Therefore, the first terminal device may reserve the first resource block according to duration that is determined according to the reservation indication information and in which the first resource block may be reserved, so that a terminal device is prevented from keeping using a particular resource block, and network resources are allocated fairly.

Figure 8:
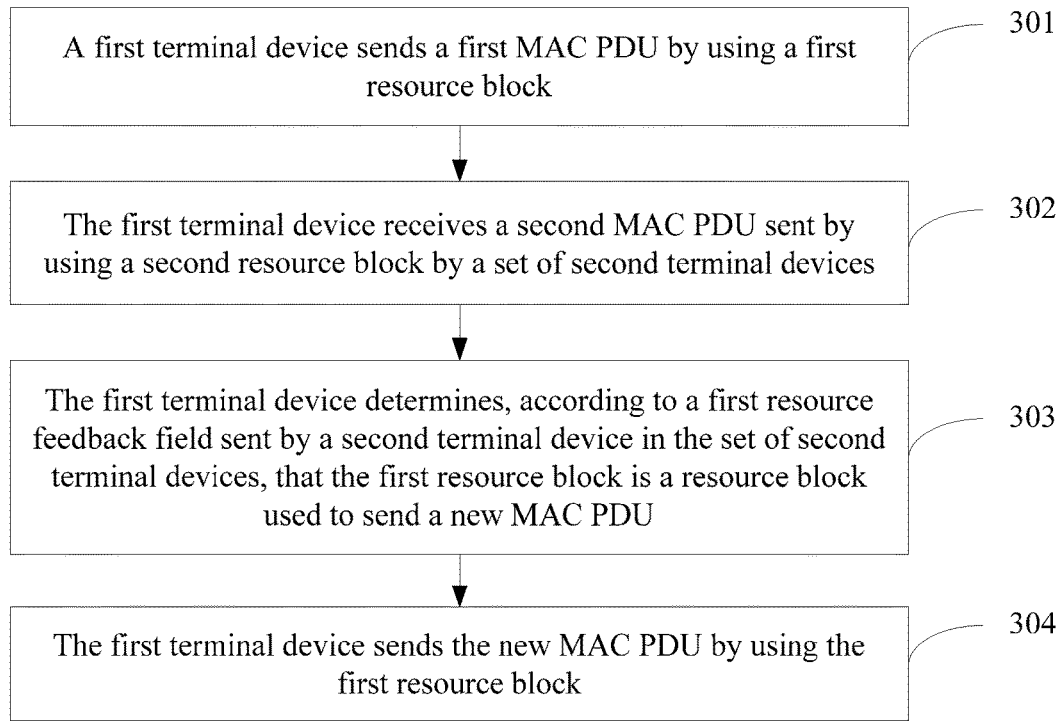
FIG. 8 is a schematic flowchart of a data transmission method according to another embodiment of the present invention.

Another embodiment of the present invention provides a data transmission method. As shown in FIG. 8, the method may include the following steps.

301. A first terminal device sends a first MAC PDU by using a first resource block.

The first MAC PDU carries a first reservation indicator field, so as to instruct the first terminal device to reserve the first resource block.

Specifically, when the first terminal device needs to send the first MAC PDU, the first terminal device may randomly select, from all resource blocks included in a contention resource pool, a resource block as the first resource block; and then adds the first reservation indicator field used to instruct to reserve the first resource block to the first MAC PDU, and broadcasts the first MAC PDU to a surrounding terminal device by using the first resource block.

302. The first terminal device receives a second MAC PDU sent by using a second resource block by a set of second terminal devices.

The set of second terminal devices includes at least one second terminal device. The second MAC PDU carries a first resource feedback field, so as to indicate that the first resource block is successfully reserved.

Certainly, the first resource feedback field may be further used to indicate whether a resource block in the contention resource pool other than the first resource block is successfully reserved.

303. The first terminal device determines, according to a first resource feedback field sent by a second terminal device in the set of second terminal devices, that the first resource block is a resource block used to send a new MAC PDU.

304. The first terminal device sends the new MAC PDU by using the first resource block.

Specifically, after the first terminal device sends, by using the first resource block, the first MAC PDU that carries the first reservation indicator field, if the first terminal device receives the second MAC PDU that is sent by the set of second terminal devices by using the second resource block and that carries the first resource feedback field used to indicate that the first resource block is successfully reserved, the first terminal device may determine, according to the first resource feedback field carried in the received second MAC PDU sent by the second terminal device in the set of second terminal devices, that the first resource block is the resource block used to send the new MAC PDU, that is, the first terminal device may determine, according to the first resource feedback field carried in the received second MAC PDU, whether the first resource block is successfully reserved, and when the first resource block is successfully reserved, continue to use the first resource block to perform subsequent data transmission.

According to the data transmission method provided in this embodiment of the present invention, the first terminal device sends, by using the first resource block, the first MAC PDU that carries the first reservation indicator field used to instruct to reserve the first resource block; then, after receiving the second MAC PDU that is sent by the set of second terminal devices by using the second resource block and that carries the first resource feedback field used to indicate that the first resource block is successfully reserved, determines, according to the first resource feedback field carried in the second MAC PDU sent by the second terminal device in the set of second terminal devices, that the first resource block is the resource block used to send the new MAC PDU; and sends the new MAC PDU by using the first resource block. When reserving the first resource block according to an instruction of the first reservation indicator field, and determining, according to a resource feedback field carried in a received MAC PDU sent by another terminal device, that the first resource block is successfully reserved, that is, no resource collision occurs, the first terminal device continues to use the first resource block to transmit the new MAC PDU. Therefore, a transmission resource collision rate is effectively reduced, and transmission efficiency is improved.

Further, the second MAC PDU that is received in step 302 and that is sent by the second terminal device further carries a second reservation indicator field, so as to instruct the second terminal device to reserve the second resource block.

Further, the first resource feedback field carried in the second MAC PDU that is received in step 302 and that is sent by the second terminal device is used to indicate that the first resource block is not successfully reserved. In this case, the data transmission method provided in this embodiment of the present invention may further include: determining, by the first terminal device from the contention resource pool according to the first resource feedback field sent by the second terminal device in the set of second terminal devices and the second reservation indicator field sent by all the second terminal devices in the set of second terminal devices, a new resource block as the resource block used to send the new MAC PDU; and sending the new MAC PDU by using the new resource block.

Further, to fairly allocate network resources and prevent a terminal device from keeping using a particular resource block, in this embodiment of the present invention, duration in which the first terminal device reserves the first resource block may be limited. In a first possible implementation, before step 301, the data transmission method may further include: obtaining, by the first terminal device, configuration information, where the configuration information includes reservation indication information; determining, by the first terminal device, a timing time of a timer according to the reservation indication information, where the timing time is duration in which the first terminal device reserves the first resource block; and starting, by the first terminal device, the timer when the first terminal device sends the first MAC PDU by using the first resource block.

In this case, step 303 may specifically include: when the timer does not stop timing, determining, by the first terminal device according to the first resource feedback field sent by the second terminal device in the set of second terminal devices, that the first resource block is the resource block used to send the new MAC PDU.

Further, in this embodiment of the present invention, the data transmission method may further include: when the timer stops timing, determining, by the first terminal device from the contention resource pool according to the first resource feedback field sent by the second terminal device in the set of second terminal devices and the second reservation indicator field sent by all the second terminal devices in the set of second terminal devices, a new resource block as the resource block used to send the new MAC PDU.

Further, the determining, by the first terminal device from the contention resource pool according to the first resource feedback field sent by the second terminal device in the set of second terminal devices and the second reservation indicator field sent by all the second terminal devices in the set of second terminal devices, a new resource block as the resource block used to send the new MAC PDU may specifically include: when the timer stops timing or when the timer does not stop timing, determining, by the first terminal device from the contention resource pool according to the first resource feedback field sent by the second terminal device in the set of second terminal devices and the second reservation indicator field sent by all the second terminal devices in the set of second terminal devices, the new resource block as the resource block used to send the new MAC PDU.

Further, before step 301, the data transmission method may further include: configuring, by the first terminal device, the first reservation indicator field as a preset value.

Further, the reservation indication information in the configuration information obtained by the first terminal device includes reservation duration indication information, so as to indicate reservable duration or a reservable duration range.

The determining, by the first terminal device, a timing time of a timer according to the reservation indication information may specifically include: when the reservation duration indication information is used to indicate the reservable duration, determining, by the first terminal device according to the reservation duration indication information, that the reservable duration is the timing time of the timer; or when the reservation duration indication information is used to indicate the reservable duration range, determining, by the first terminal device according to the reservation duration indication information, that any duration within the reservable duration range is the timing time of the timer.

Further, to fairly allocate network resources and prevent a terminal device from keeping using a particular resource block, in this embodiment of the present invention, duration in which the first terminal device reserves the first resource block may be limited. In a second possible implementation, before step 301, the data transmission method may further include: obtaining, by the first terminal device, configuration information, where the configuration information includes reservation indication information; and determining, by the first terminal device, reservation duration according to the reservation indication information, where the reservation duration is duration in which the first terminal device reserves the first resource block.

The first reservation indicator field is further used to indicate a time parameter, the time parameter is greater than or equal to 0, and the time parameter is used to indicate the reservation duration. The time parameter gradually decreases over time.

In this case, step 303 may specifically include: when the time parameter is not 0, determining, by the first terminal device according to the first resource feedback field sent by the second terminal device in the set of second terminal devices, that the first resource block is the resource block used to send the new MAC PDU.

Further, the method includes: when the time parameter is 0, the first terminal device determines, from the contention resource pool according to the first resource feedback field sent by the second terminal device in the set of second terminal devices and the second reservation indicator field sent by all the second terminal devices in the set of second terminal devices, a new resource block as the resource block used to send the new MAC PDU.

Further, the determining, by the first terminal device from the contention resource pool according to the first resource feedback field sent by the second terminal device in the set of second terminal devices and the second reservation indicator field sent by all the second terminal devices in the set of second terminal devices, a new resource block as the resource block used to send the new MAC PDU may specifically include: when the time parameter is 0 or when the time parameter is not 0, determining, by the first terminal device from the contention resource pool according to the first resource feedback field sent by the second terminal device in the set of second terminal devices and the second reservation indicator field sent by all the second terminal devices in the set of second terminal devices, the new resource block as the resource block used to send the new MAC PDU.

It can be understood that the first reservation indicator field carried in the first MAC PDU sent by the first terminal device decreases over time because the time parameter decreases over time.

Further, before step 301, the data transmission method may further include: configuring, by the first terminal device, the first reservation indicator field according to the reservation duration.

Further, the reservation indication information includes reservation duration indication information, so as to indicate reservable duration or a reservable duration range; or the reservation indication information includes reservation duration indication information and information that carries a reservation indicator field length.

The determining, by the first terminal device, reservation duration according to the reservation indication information may specifically include:

if the reservation indication information includes the reservation duration indication information and the reservation duration indication information is used to indicate the reservable duration, determining, by the first terminal device according to the reservation duration indication information, that the reservable duration is the reservation duration; or if the reservation indication information includes the reservation duration indication information and the reservation duration indication information is used to indicate the reservable duration range, determining, by the first terminal device according to the reservation duration indication information, that any duration within the reservable duration range is the reservation duration; or if the reservation indication information includes the reservation duration indication information and the information that carries the reservation indicator field length, determining, by the first terminal device, the reservation duration according to the reservation duration indication information and the information that carries the reservation indicator field length.

Further, to help a terminal device around the first terminal device to determine whether the terminal device successfully reserves a resource block, before step 301, the data transmission method in this embodiment of the present invention may further include: monitoring, by the first terminal device, the contention resource pool; and determining a second resource feedback field according to a reservation status that is of a resource block in the contention resource pool and that is obtained by means of monitoring, where the second resource feedback field is used to indicate the reservation status of the resource block in the contention resource pool before the first MAC PDU is sent.

The first MAC PDU sent by the first terminal device by using the first resource block further carries the second resource feedback field.

Further, the configuration information obtained by the first terminal device may further include resource feedback information. In this case, the determining a second resource feedback field according to a reservation status that is of a resource block in the contention resource pool and that is obtained by means of monitoring may specifically include: generating, by the first terminal device, the second resource feedback field according to the resource feedback information and the reservation status that is of the resource block in the contention resource pool and that is obtained by means of monitoring.

Further, the resource feedback information includes information about a condition for carrying a resource feedback field and/or information that carries a resource feedback field length.

In this case, the generating, by the first terminal device, the second resource feedback field according to the resource feedback information and the reservation status that is of the resource block in the contention resource pool and that is obtained by means of monitoring may specifically include:

when the resource feedback information includes the information about the condition for carrying a resource feedback field, when determining that the information about the condition for carrying a resource feedback field is met, generating, by the first terminal device, the second resource feedback field according to preset information that carries a resource feedback field length and according to the reservation status that is of the resource block in the contention resource pool and that is obtained by means of monitoring; or when the resource feedback information includes the information that carries the resource feedback field length, generating, by the first terminal device, the second resource feedback field according to the information that carries the resource feedback field length and that is included in the resource feedback information and according to the reservation status that is of the resource block in the contention resource pool and that is obtained by means of monitoring; or when the resource feedback information includes the information about the condition for carrying a resource feedback field and the information that carries the resource feedback field length, when determining that the information about the condition for carrying a resource feedback field is met, generating, by the first terminal device, the second resource feedback field according to the information that carries the resource feedback field length and that is included in the resource feedback information and according to the reservation status that is of the resource block in the contention resource pool and that is obtained by means of monitoring.

Further, in a possible implementation, a specific manner of obtaining, by the first terminal device, the configuration information may specifically include: obtaining, by the first terminal device, the pre-configured configuration information. In another possible implementation, a specific manner of obtaining, by the first terminal device, the configuration information may specifically include: receiving, by the first terminal device, the configuration information sent by a network device.

Further, a specific implementation of receiving, by the first terminal device, the configuration information sent by the network device may include: receiving, by the first terminal device, the configuration information sent by using system information or radio resource control (RRC for short) signaling by the network device.

For example, the RRC signaling may be specifically RRC connection reconfiguration (RRC Connection Reconfiguration) information.

Further, the configuration information obtained by the first terminal device may further include information about the contention resource pool.

In this case, after the first terminal device obtains the configuration information, the data transmission method may further include: selecting, by the first terminal device from the contention resource pool, a resource block as the first resource block according to the information about the contention resource pool.

Further, for a specific form in which the first MAC PDU carries the first reservation indicator field or carries the first reservation indicator field and the second resource feedback field, in a first possible implementation, the first reservation indicator field is included in a MAC header of the first MAC PDU, and the MAC header further includes an extension indicator field, so as to indicate whether the first MAC PDU carries the second resource feedback field, and when the extension indicator field indicates that the first MAC PDU carries the second resource feedback field, the second resource feedback field is included in the MAC header of the first MAC PDU.

Further, for a specific form in which the first MAC PDU carries the first reservation indicator field or carries the first reservation indicator field and the second resource feedback field, in a second possible implementation, when the first MAC PDU carries the first reservation indicator field, the first reservation indicator field is included in a payload field of the first MAC PDU, and a MAC header of the first MAC PDU includes a MAC subheader, so as to indicate that data corresponding to the MAC subheader is the first reservation indicator field; or when the first MAC PDU carries the first reservation indicator field and the second resource feedback field, the first reservation indicator field and the second resource feedback field are included in a payload field of the first MAC PDU, and a MAC header of the first MAC PDU includes a MAC subheader, so as to indicate that data corresponding to the MAC subheader is the first reservation indicator field and the second resource feedback field.

Figure 9:
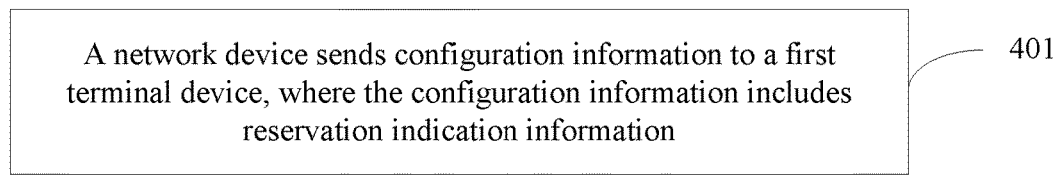
FIG. 9 is a schematic flowchart of a data transmission method according to another embodiment of the present invention.

Another embodiment of the present invention provides a data transmission method. As shown in FIG. 9, the data transmission method may include the following steps.

401. A network device sends configuration information to a first terminal device, where the configuration information includes reservation indication information.

According to the data transmission method provided in this embodiment of the present invention, the network device sends the configuration information that includes the reservation indication information to the first terminal device. Therefore, the first terminal device may reserve a first resource block according to duration that is determined according to the reservation indication information and in which the first resource block may be reserved, so that a terminal device is prevented from keeping using a particular resource block, and network resources are allocated fairly.

Further, the reservation indication information includes reservation duration indication information, so as to indicate reservable duration or a reservable duration range; or the reservation indication information includes the reservation duration indication information and information that carries a reservation indicator field length.

Further, the configuration information may further include resource feedback information, and the resource feedback information may include information about a condition for carrying a resource feedback field and/or information that carries a resource feedback field length.

Further, step 401 may specifically include: sending, by the network device, the configuration information to the first terminal device by using system information or RRC signaling.

Figure 10A:
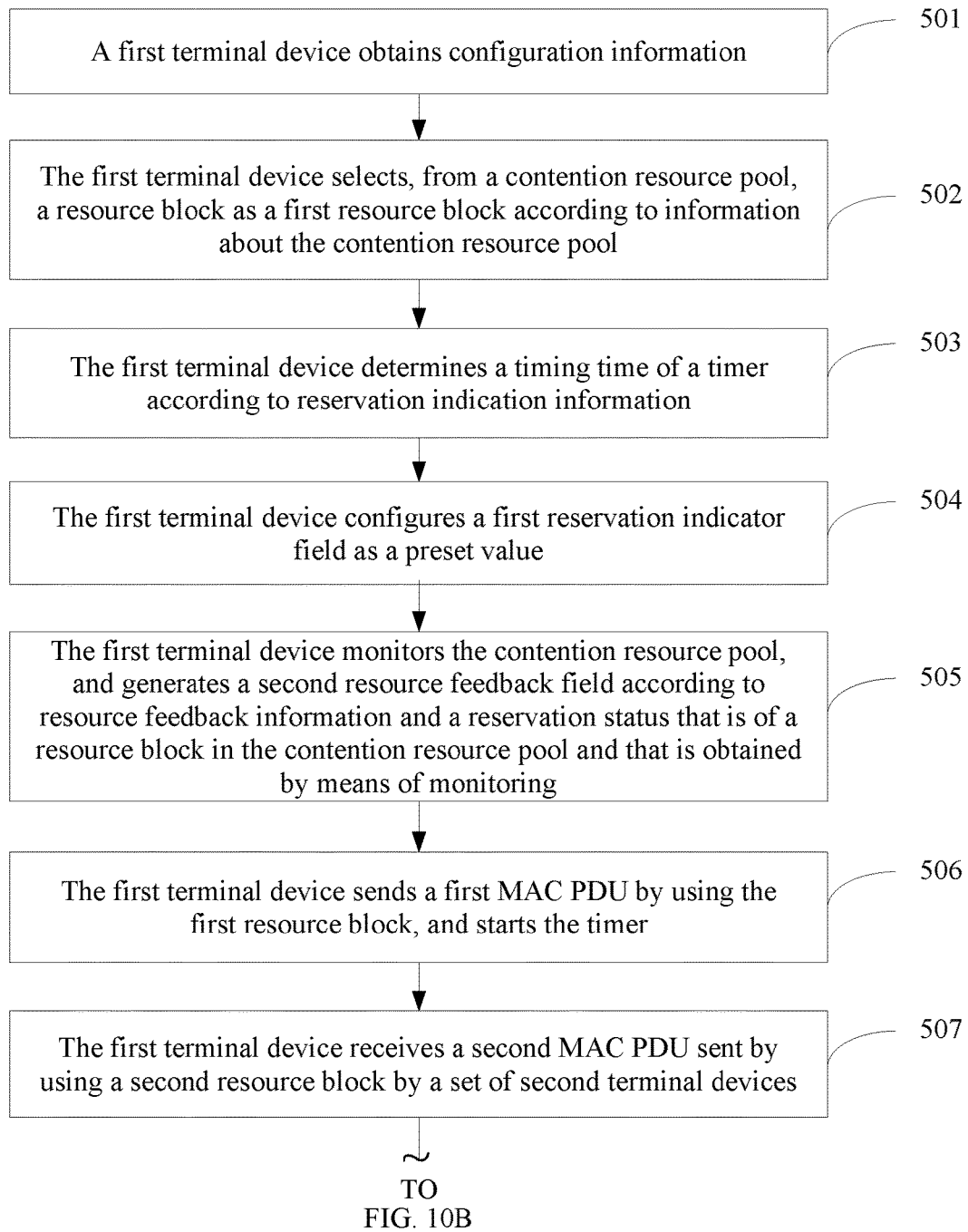
FIG. 10A and FIG. 10B are a schematic flowchart of a data transmission method according to another embodiment of the present invention.
Figure 10B:
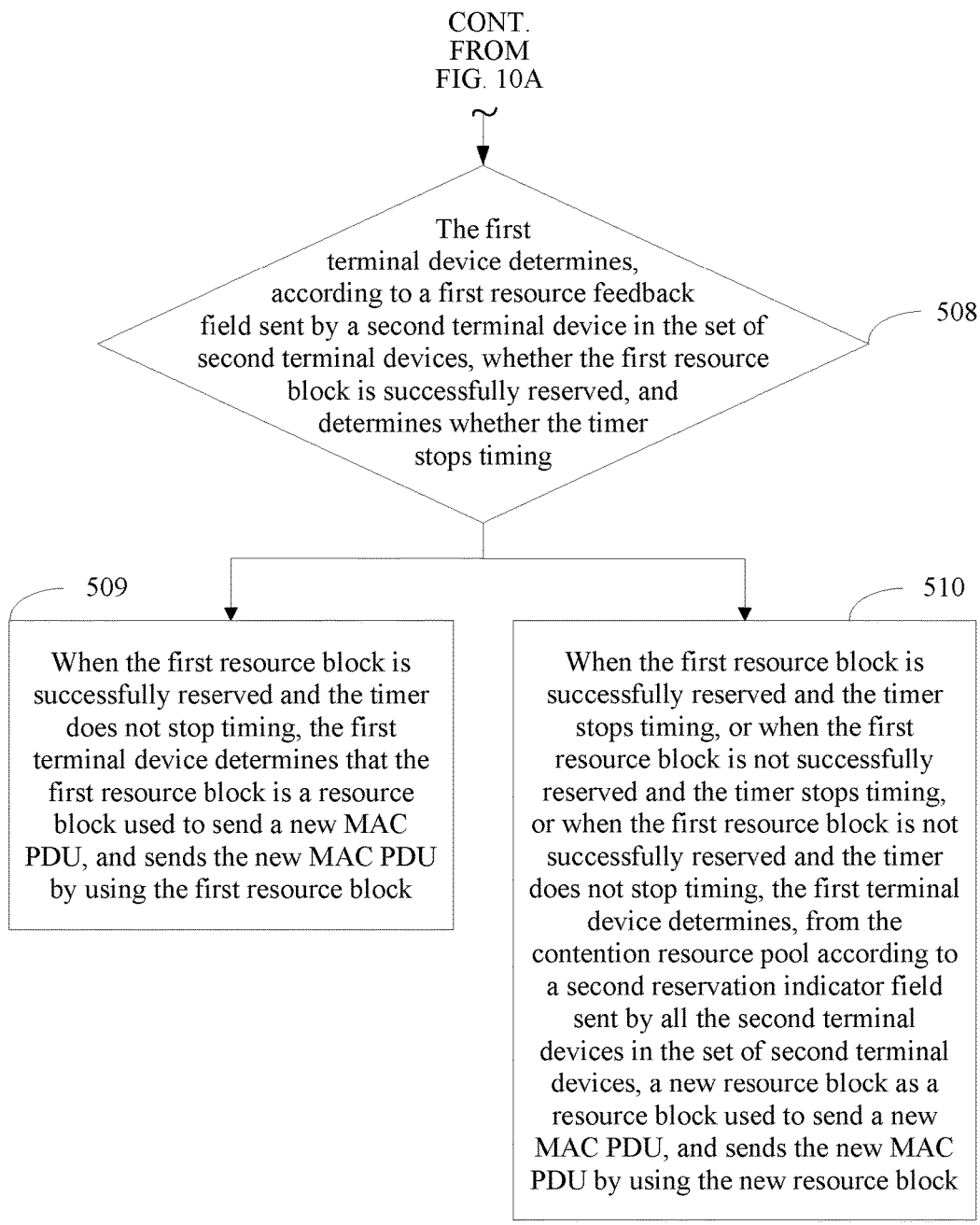

Another embodiment of the present invention provides a data transmission method. For example, reservation duration in which a first terminal device reserves a first resource block is set by using a timer. As shown in FIG. 10A and FIG. 10B, the method may include the following steps.

501. The first terminal device obtains configuration information.

The configuration information may include information about a contention resource pool. Further, to limit duration in which the first terminal device reserves a first resource block, the configuration information may further include reservation indication information. The reservation indication information may include reservation duration indication information, so as to indicate reservable duration or a reservable duration range. In addition, further, to help another terminal device to determine whether the another terminal device successfully reserves a resource block, the configuration information may further include resource feedback information. The resource feedback information may include information about a condition for carrying a resource feedback field and/or information that carries a resource feedback field length. When the resource feedback information includes the information about the condition for carrying a resource feedback field, a length of a resource feedback field that may be carried may be pre-configured in the first terminal device, or may be set by the first terminal device according to a requirement in a practical application scenario.

Specifically, the configuration information may be pre-configured in the first terminal device, or may be obtained by the first terminal device from a network device, that is, the first terminal device may obtain the configuration information in either of the following manners:

Manner 1: The first terminal device obtains the pre-configured configuration information.

Manner 2: The first terminal device receives the configuration information sent by the network device.

For example, the network device may send the configuration information to the first terminal device by using system information or RRC signaling. In this case, the first terminal device may receive, by using the system information or the RRC signaling, the configuration information sent by the network device.

After obtaining the configuration information, the first terminal device may perform the following step 502 to step 505 when the first terminal device needs to send data.

502. The first terminal device selects, from a contention resource pool, a resource block as a first resource block according to information about the contention resource pool.

After the first terminal device obtains the configuration information, when the first terminal device needs to send data, the first terminal device may randomly select, from the contention resource pool, a resource block as the first resource block according to the information that is about the contention resource pool and that is included in the configuration information.

In a D2D communication mode 2 of a D2D communication technology, the information about the contention resource pool may include information about an SA resource pool and information about a data resource pool; and the contention resource pool may include the SA resource pool and the data resource pool. In a D2D discovery type 1 of a D2D discovery technology, the information about the contention resource pool may include information about a data resource pool, and the contention resource pool may include the data resource pool.

For example, in the D2D communication mode 2 of the D2D communication technology, the first terminal device may randomly select an SA resource block from the SA resource pool and a data resource block from the data resource pool according to the information about the SA resource pool and the information about the data resource pool. That is, in this scenario, the first resource block in this embodiment of the present invention includes an SA resource block and a data resource block. In the D2D discovery type 1 of the D2D discovery technology, the first terminal device may randomly select a data resource block from the data resource pool according to the information about the data resource pool. That is, in this scenario, the first resource block in this embodiment of the present invention is a data resource block.

503. The first terminal device determines a timing time of a timer according to reservation indication information.

The timing time of the timer is the duration in which the first terminal device reserves the first resource block. After obtaining the configuration information, the first terminal device may determine, according to the reservation indication information included in the configuration information, the timing time of the timer and use the timing time as the duration in which the first terminal device may reserve the first resource block.

The determining, by the first terminal device, a timing time of a timer according to reservation indication information may specifically include:

when the reservation duration indication information is used to indicate the reservable duration, determining, by the first terminal device according to the reservation duration indication information, that the reservable duration is the timing time of the timer; or when the reservation duration indication information is used to indicate the reservable duration range, determining, by the first terminal device according to the reservation duration indication information, that any duration within the reservable duration range is the timing time of the timer.

504. The first terminal device configures a first reservation indicator field as a preset value.

When the first terminal device needs to reserve the first resource block, the first terminal device may configure the first reservation indicator field as the preset value, so as to indicate that reservation of a resource block used to currently perform data transmission is expected, that is, reservation of the first resource block is expected.

For example, when a length of the first reservation indicator field is 1 bit, "1" may be set as a preset value, that is, when the first terminal device needs to reserve the first resource block, the first terminal device may configure the first reservation indicator field as "1", so as to indicate that reservation of the first resource block is expected. Certainly, if the first terminal device does not need to reserve the first resource block, the first terminal device may configure the first reservation indicator field as "0".

505. The first terminal device monitors the contention resource pool, and generates a second resource feedback field according to resource feedback information and a reservation status that is of a resource block in the contention resource pool and that is obtained by means of monitoring.

To help another terminal device to determine whether the terminal device successfully reserves a resource block, after receiving the configuration information, the first terminal device may monitor the contention resource pool; and generate, according to the resource feedback information included in the configuration information and the reservation status that is of the resource block in the contention resource pool and that is obtained by means of monitoring, the second resource feedback field used to indicate the reservation status of the resource block in the contention resource pool before a first MAC PDU is sent. If the first terminal device successfully receives data on a resource block in the contention resource pool before sending the first MAC PDU, the first terminal device considers that the resource block is successfully reserved; or if the first terminal device does not successfully receive data on a resource block in the contention resource pool (unsuccessfully receiving data may be receiving no data on the resource block, or may be receiving data on the resource block but not successfully decoding the data) before sending the first MAC PDU, the first terminal device considers that the resource block is not successfully reserved.

The resource feedback information may include information about a condition for carrying a resource feedback field and/or information that carries a resource feedback field length. In this case, the generating, by the first terminal device, a second resource feedback field according to resource feedback information and a reservation status that is of a resource block in the contention resource pool and that is obtained by means of monitoring may specifically include:

when the resource feedback information includes the information about the condition for carrying a resource feedback field, when determining that the information about the condition for carrying a resource feedback field is met, generating, by the first terminal device, the second resource feedback field according to preset information that carries a resource feedback field length and according to the reservation status that is of the resource block in the contention resource pool and that is obtained by means of monitoring; or when the resource feedback information includes the information that carries the resource feedback field length, generating, by the first terminal device, the second resource feedback field according to the information that carries the resource feedback field length and that is included in the resource feedback information and according to the reservation status that is of the resource block in the contention resource pool and that is obtained by means of monitoring; or when the resource feedback information includes the information about the condition for carrying a resource feedback field and the information that carries the resource feedback field length, when determining that the information about the condition for carrying a resource feedback field is met, generating, by the first terminal device, the second resource feedback field according to the information that carries the resource feedback field length and that is included in the resource feedback information and according to the reservation status that is of the resource block in the contention resource pool and that is obtained by means of monitoring.

The information about the condition for carrying a resource feedback field may be a probability value. The first terminal device may determine, according to the probability value, whether the information about the condition for carrying a resource feedback field is met.

For example, the second resource feedback field may be in a bitmap (bitmap) form. Each bit represents one resource block in the contention resource pool. In addition, "0" may be used to indicate that the resource block is not successfully reserved, and "1" may be used to indicate that the resource block is successfully reserved. For example, the resource feedback information includes the information that carries the resource feedback field length, and the information that carries the resource feedback field length is 3 bits. Therefore, before sending the first MAC PDU, the first terminal device may determine, according to a monitoring status of the contention resource pool, reservation statuses of three resource blocks preceding the first resource block (or three resource blocks following the first resource block); and generate the second resource feedback field according to the reservation statuses of the corresponding resource blocks and the information that carries the resource feedback field length. For example, before sending the first MAC PDU, the first terminal device does not successfully receive data on the 1st resource block in the three resource blocks preceding the first resource block; successfully receives data on the 2nd resource block; and does not successfully receive data on the 3rd resource block. In this case, the first terminal device may determine that the 1st resource block in the three resource blocks preceding the first resource block is not successfully reserved, the 2nd resource block is successfully reserved, and the 3rd resource block is not successfully reserved. Therefore, the second resource feedback field generated by the first terminal device according to the reservation statuses of the corresponding resource blocks and the information that carries the resource feedback field length is 010.

506. The first terminal device sends a first MAC PDU by using the first resource block, and starts the timer.

After the first terminal device configures the first reservation indicator field, generates the second resource feedback field, and determines the timing time of the timer, the first terminal device may send, by using the first resource block, the first MAC PDU that carries the first reservation indicator field, the second resource feedback field, and data that needs to be sent; and start the timer when sending the first MAC PDU, so that the timer starts timing.

For example, in the D2D communication mode 2 of the D2D communication technology, the first resource block includes an SA resource block and a data resource block. Therefore, the sending, by the first terminal device, a first MAC PDU by using the first resource block specifically includes: first broadcasting, by the first terminal device, SA information by using the SA resource block, where the SA information is used to indicate a time-frequency resource location of the data resource block in the data resource pool and a modulation and coding scheme; then broadcasting, by using the data resource block, the first MAC PDU according to the modulation and coding scheme indicated by the SA information; and starting the timer.

For example, in the D2D discovery type 1 of the D2D discovery technology, the first resource block is a data resource block. Therefore, the sending, by the first terminal device, a first MAC PDU by using the first resource block specifically includes: broadcasting the first MAC PDU by using the data resource block, and starting the timer.

Figure 11:
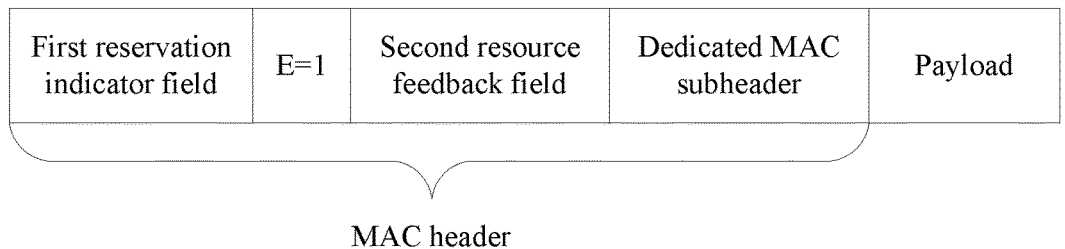
FIG. 11 is a schematic diagram of a format of a first MAC PDU according to another embodiment of the present invention.
Figure 12:
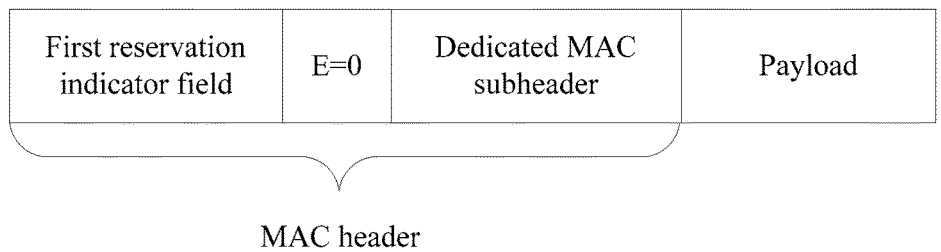
FIG. 12 is a schematic diagram of a format of another first MAC PDU according to another embodiment of the present invention.

For a specific form in which the first MAC PDU carries the first reservation indicator field or carries the first reservation indicator field and the second resource feedback field, in a first possible implementation, the first reservation indicator field is included in a MAC header of the first MAC PDU, and the MAC header further includes an extension indicator field, so as to indicate whether the first MAC PDU carries the second resource feedback field, and when the extension indicator field indicates that the first MAC PDU carries the second resource feedback field, the second resource feedback field is included in the MAC header of the first MAC PDU. A specific format of the first MAC PDU may be shown in FIG. 11 and FIG. 12.

Figure 13:
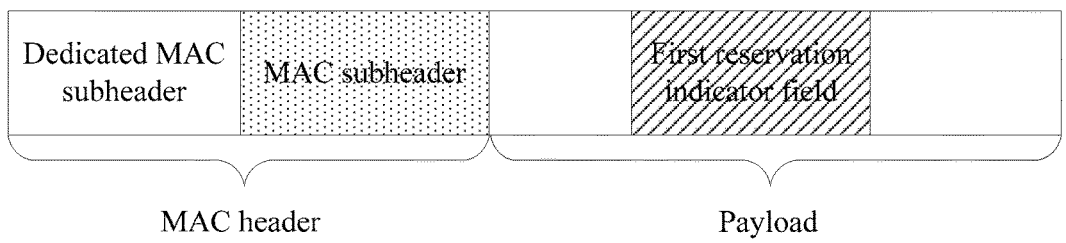
FIG. 13 is a schematic diagram of a format of still another first MAC PDU according to another embodiment of the present invention.
Figure 14:
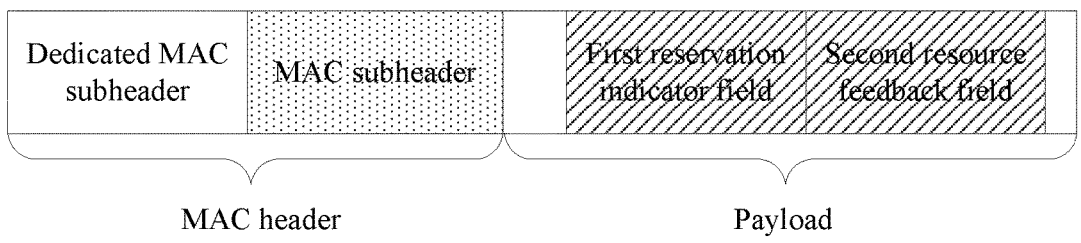
FIG. 14 is a schematic diagram of a format of yet another first MAC PDU according to another embodiment of the present invention.

In a second possible implementation, when the first MAC PDU carries the first reservation indicator field, the first reservation indicator field is included in a payload field of the first MAC PDU, and a MAC header of the first MAC PDU includes a MAC subheader, so as to indicate that data corresponding to the MAC subheader is the first reservation indicator field. A specific format of the first MAC PDU may be shown in FIG. 13. Alternatively, when the first MAC PDU carries the first reservation indicator field and the second resource feedback field, the first reservation indicator field and the second resource feedback field are included in a payload field of the first MAC PDU, and a MAC header of the first MAC PDU includes a MAC subheader, so as to indicate that data corresponding to the MAC subheader is the first reservation indicator field and the second resource feedback field. A specific format of the first MAC PDU may be shown in FIG. 14.

It should be noted that schematic diagrams of the specific format of the first MAC PDU shown in FIG. 11 to FIG. 14 provided in this embodiment of the present invention merely describe a field that may be included in the first MAC PDU, and do not set a specific limitation on a length of each field. The length of each field shown in FIG. 11 to FIG. 14 is merely an example. That is, this embodiment of the present invention sets no specific limitation on a type of the field included in the first MAC PDU and the length of each field herein. Specifically, the type of the field included in the first MAC PDU and the length of each field may be set according to a requirement in a practical application scenario.

507. The first terminal device receives a second MAC PDU sent by using a second resource block by a set of second terminal devices.

The set of second terminal devices includes at least one second terminal device. The second MAC PDU carries a second reservation indicator field and a first resource feedback field. The second reservation indicator field is used to instruct the second terminal device to reserve the second resource block, and the first resource feedback field is used to indicate whether the first resource block is successfully reserved.

After the first terminal device sends, by using the first resource block, the first MAC PDU that carries the first reservation indicator field, the second resource feedback field, and the data that needs to be sent, if the first terminal device receives the second MAC PDU that is sent by the set of second terminal devices by using the second resource block and that carries the second reservation indicator field and the first resource feedback field, when the first terminal device needs to send a new MAC PDU, the first terminal device may determine, according to the second reservation indicator field and the first resource feedback field that are carried in the received second MAC PDU and the timing time of the timer, a resource block used to send the new MAC PDU. This may specifically include the following step 508 to step 510.

508. The first terminal device determines, according to a first resource feedback field sent by a second terminal device in the set of second terminal devices, whether the first resource block is successfully reserved, and determines whether the timer stops timing.

After receiving the second MAC PDU that is sent by the set of second terminal devices by using the second resource block and that carries the second reservation indicator field and the first resource feedback field, the first terminal device may determine, according to the first resource feedback field carried in the received second MAC PDU sent by the second terminal device in the set of second terminal devices, whether the first resource block is successfully reserved; and determine whether the timer stops timing.

For example, in the D2D communication mode 2 of the D2D communication technology, that the first resource block is successfully reserved means that both an SA resource block and a data resource block are successfully reserved, and that the first resource block is not successfully reserved means that at least one of an SA resource block or a data resource block is not successfully reserved. In the D2D discovery type 1 of the D2D discovery technology, that the first resource block is successfully reserved means that a data resource block is successfully reserved, and that the first resource block is not successfully reserved means that a data resource block is not successfully reserved.

509. When the first resource block is successfully reserved and the timer does not stop timing, the first terminal device determines that the first resource block is a resource block used to send a new MAC PDU, and sends the new MAC PDU by using the first resource block.

A reservation indicator field carried in the new MAC PDU is a preset value, and is used to indicate that further reservation of the first resource block is expected.

510. When the first resource block is successfully reserved and the timer stops timing, or when the first resource block is not successfully reserved and the timer stops timing, or when the first resource block is not successfully reserved and the timer does not stop timing, the first terminal device determines, from the contention resource pool according to a second reservation indicator field sent by all the second terminal devices in the set of second terminal devices, a new resource block as a resource block used to send a new MAC PDU, and sends the new MAC PDU by using the new resource block.

According to the data transmission method provided in this embodiment of the present invention, the first terminal device sends, by using the first resource block, the first MAC PDU that carries the first reservation indicator field used to instruct to reserve the first resource block; then, after receiving the second MAC PDU that is sent by the set of second terminal devices by using the second resource block and that carries the first resource feedback field used to indicate that the first resource block is successfully reserved, determines, according to the first resource feedback field carried in the second MAC PDU sent by the second terminal device in the set of second terminal devices, that the first resource block is the resource block used to send the new MAC PDU; and sends the new MAC PDU by using the first resource block. When reserving the first resource block according to an instruction of the first reservation indicator field, and determining, according to a resource feedback field carried in a received MAC PDU sent by another terminal device, that the first resource block is successfully reserved, that is, no resource collision occurs, the first terminal device continues to use the first resource block to transmit the new MAC PDU; or when determining, according to a resource feedback field carried in a received MAC PDU sent by another terminal device, that the first resource block is not successfully reserved, that is, resource collision occurs, the first terminal device reselects a new resource block to transmit the new MAC PDU. Therefore, a transmission resource collision rate is effectively reduced, and transmission efficiency is improved.

In addition, the first resource block is reserved by using the duration that is determined according to the reservation indication information in the configuration information and in which the first terminal device may reserve the first resource block, so that a terminal device is prevented from keeping using a particular resource block, and network resources are allocated fairly.

Figure 15A:
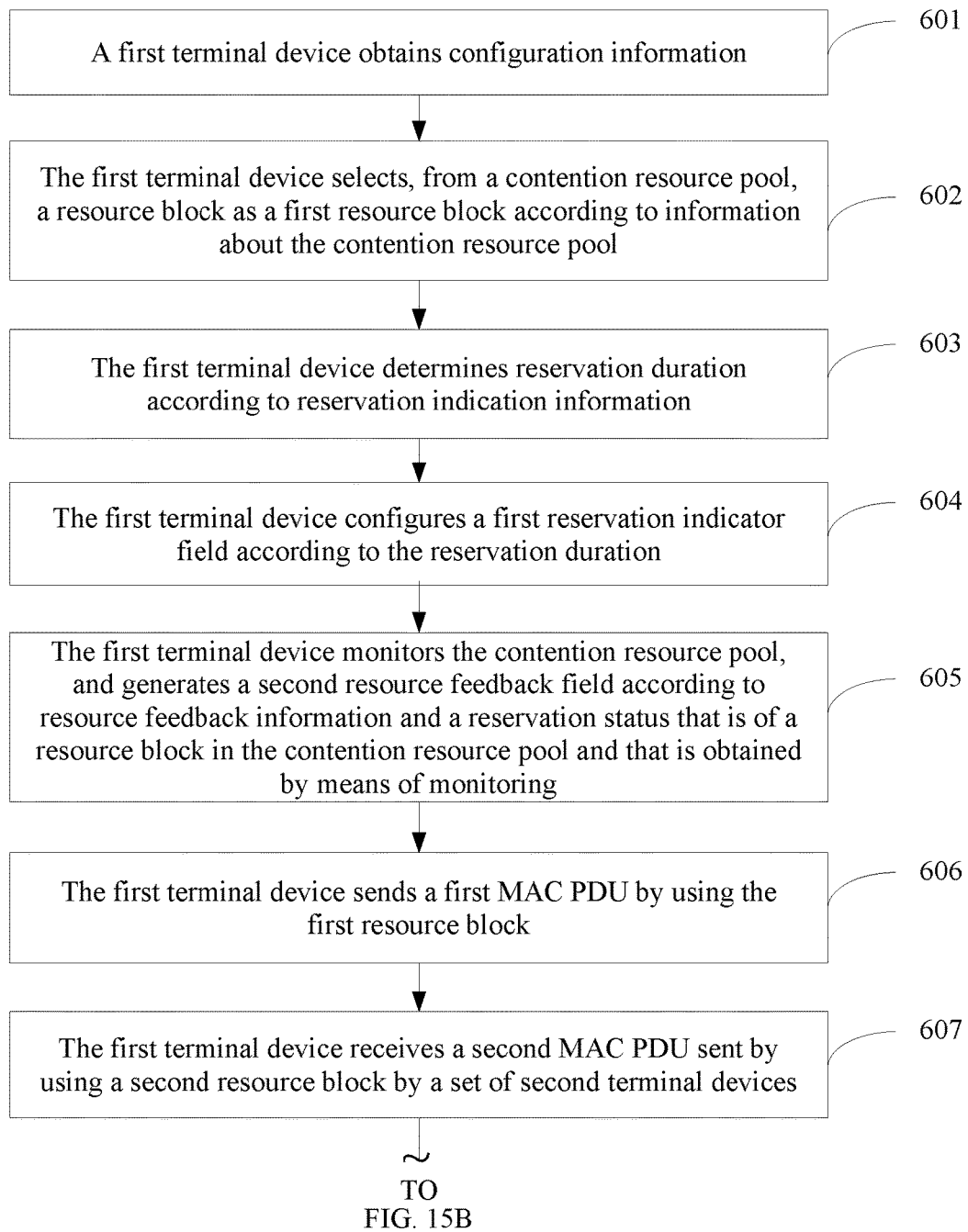
FIG. 15A and FIG. 15B are a schematic flowchart of a data transmission method according to another embodiment of the present invention.
Figure 15B:
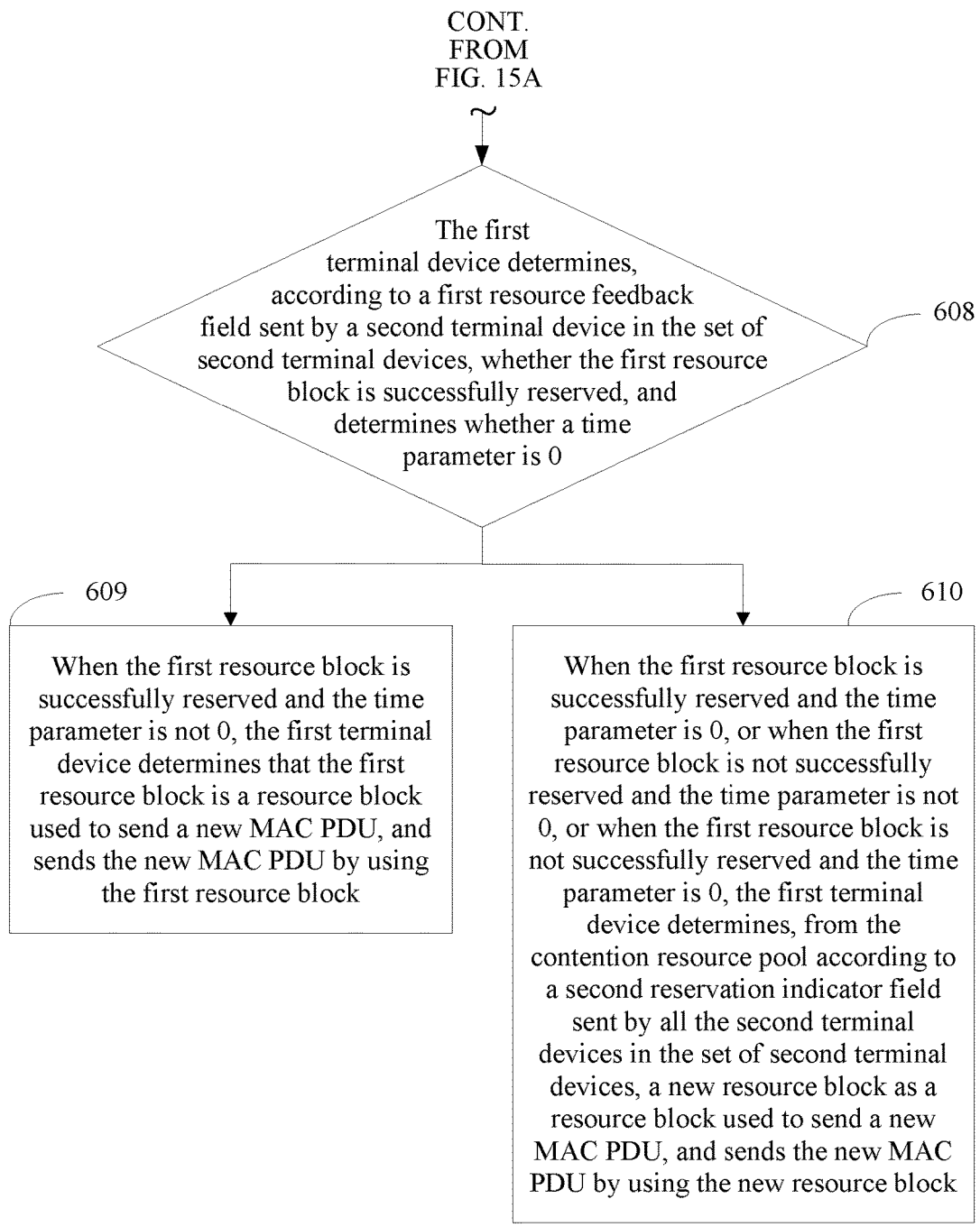

Another embodiment of the present invention provides a data transmission method. For example, reservation duration in which a first terminal device reserves a first resource block is set by using a time parameter. As shown in FIG. 15A and FIG. 15B, the method may include the following steps.

601. The first terminal device obtains configuration information.

The configuration information may include information about a contention resource pool. Further, to limit duration in which the first terminal device reserves a first resource block, the configuration information may further include reservation indication information. The reservation indication information may include reservation duration indication information, so as to indicate reservable duration or a reservable duration range; or the reservation indication information includes reservation duration indication information and information that carries a reservation indicator field length. In addition, further, to help another terminal device to determine whether a resource of the another terminal device is successfully reserved, the configuration information may further include resource feedback information. The resource feedback information may include information about a condition for carrying a resource feedback field and/or information that carries a resource feedback field length. When the resource feedback information includes the information about the condition for carrying a resource feedback field, a length of a resource feedback field that may be carried may be pre-configured in the first terminal device, or may be set by the first terminal device according to a requirement in a practical application scenario.

After obtaining the configuration information, the first terminal device may perform the following step 602 to step 605 when the first terminal device needs to send data.

602. The first terminal device selects, from a contention resource pool, a resource block as a first resource block according to information about the contention resource pool.

603. The first terminal device determines reservation duration according to reservation indication information.

The reservation duration is the duration in which the first terminal device reserves the first resource block. After obtaining the configuration information, the first terminal device may determine, according to the reservation indication information included in the configuration information, the reservation duration and use the reservation duration as a time in which the first terminal device may reserve the first resource block.

The determining, by the first terminal device, reservation duration according to reservation indication information may specifically include:

if the reservation indication information includes the reservation duration indication information and the reservation duration indication information is used to indicate the reservable duration, determining, by the first terminal device according to the reservation duration indication information, that the reservable duration is the reservation duration; or if the reservation indication information includes the reservation duration indication information and the reservation duration indication information is used to indicate the reservable duration range, determining, by the first terminal device according to the reservation duration indication information, that any duration within the reservable duration range is the reservation duration; or if the reservation indication information includes the reservation duration indication information and the information that carries the reservation indicator field length, determining, by the first terminal device, the reservation duration according to the reservation duration indication information and the information that carries the reservation indicator field length.

For example, it is assumed that reservation duration=min [reservation duration indication information, information that carries a reservation indicator field length], the reservation duration indication information is [0, 20], and the information that carries the reservation indicator field length is 3 bits (bit) (which may represent a maximum value of 8). When the reservation duration indication information is used to indicate the reservable duration range, if the first terminal device initially determines, from [0, 20], that the reservation duration is 12, but the information that carries the reservation indicator field length is 3 bits, the finally determined reservation duration may be 8.

604. The first terminal device configures a first reservation indicator field according to the reservation duration.

When the first terminal device needs to reserve the first resource block, the first terminal device may configure the first reservation indicator field according to the determined reservation duration, so as to indicate that reservation of a resource block used to currently perform data transmission is expected, that is, reservation of the first resource block is expected, and indicate a time parameter. The time parameter is greater than or equal to 0, and is used to indicate the reservation duration, that is, the duration in which the first terminal device may reserve the first resource block.

605. The first terminal device monitors the contention resource pool, and generates a second resource feedback field according to resource feedback information and a reservation status that is of a resource block in the contention resource pool and that is obtained by means of monitoring.

606. The first terminal device sends a first MAC PDU by using the first resource block.

After the first terminal device configures the first reservation indicator field and generates the second resource feedback field, the first terminal device may send, by using the first resource block, the first MAC PDU that carries the first reservation indicator field, the second resource feedback field, and data that needs to be sent. In addition, the time parameter gradually decreases over time.

607. The first terminal device receives a second MAC PDU sent by using a second resource block by a set of second terminal devices.

After the first terminal device sends, by using the first resource block, the first MAC PDU that carries the first reservation indicator field, the second resource feedback field, and the data that needs to be sent, if the first terminal device receives the second MAC PDU that is sent by the set of second terminal devices by using the second resource block and that carries a second reservation indicator field and a first resource feedback field, when the first terminal device needs to send a new MAC PDU, the first terminal device may determine, according to the second reservation indicator field, the first resource feedback field, and the time parameter that are carried in the received second MAC PDU, a resource block used to send the new MAC PDU, where the time parameter gradually decreases over time. This may specifically include the following step 608 to step 610.

608. The first terminal device determines, according to a first resource feedback field sent by a second terminal device in the set of second terminal devices, whether the first resource block is successfully reserved, and determines whether a time parameter is 0.

After receiving the second MAC PDU that is sent by the set of second terminal devices by using the second resource block and that carries the second reservation indicator field and the first resource feedback field, the first terminal device may determine, according to the first resource feedback field carried in the received second MAC PDU sent by the second terminal device in the set of second terminal devices, whether the first resource block is successfully reserved, and determine whether the time parameter is 0.

609. When the first resource block is successfully reserved and the time parameter is not 0, the first terminal device determines that the first resource block is a resource block used to send a new MAC PDU, and sends the new MAC PDU by using the first resource block.

A reservation indicator field carried in the new MAC PDU is obtained by means of configuration according to a current time parameter, and is used to indicate that further reservation of the first resource block is expected.

610. When the first resource block is successfully reserved and the time parameter is 0, or when the first resource block is not successfully reserved and the time parameter is not 0, or when the first resource block is not successfully reserved and the time parameter is 0, the first terminal device determines, from the contention resource pool according to a second reservation indicator field sent by all the second terminal devices in the set of second terminal devices, a new resource block as a resource block used to send a new MAC PDU, and sends the new MAC PDU by using the new resource block.

It should be noted that for specific descriptions in step 601 to step 610 in this embodiment of the present invention, reference may be made to specific descriptions of corresponding steps in step 501 to step 510 in another embodiment of the present invention, and details are not described herein again in this embodiment of the present invention.

To make a person skilled in the art understand the data transmission method provided in this embodiment of the present invention, an example in which a terminal device is a vehicle is used in the present invention to describe a specific implementation process in the present invention.

Figure 16:
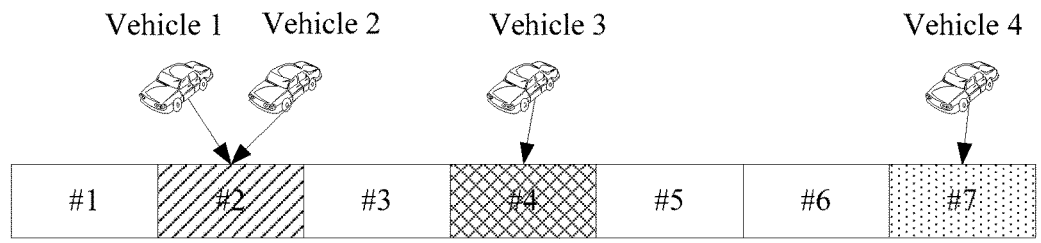
FIG. 16 is a schematic diagram of a contention resource pool according to another embodiment of the present invention.

For example, as shown in FIG. 16, a contention resource pool is divided into seven resource blocks in a time domain, and serial numbers of the seven resource blocks are #1, #2, #3, #4, #5, #6, and #7. In addition, four vehicles exist in an area: a vehicle 1, a vehicle 2, a vehicle 3, and a vehicle 4, and all the four vehicles need to transmit V2V information.

Both the vehicle 1 and the vehicle 2 select, by means of random selection according to obtained information about the contention resource pool, the resource block #2 for sending data. In addition, assuming that reservation duration determined by the vehicle 1 is 7, and a reservation indicator field configured by the vehicle 1 according to the reservation duration is 7, it indicates that the vehicle 1 expects to reserve the resource block #2 for seven periods. Assuming that reservation duration determined by the vehicle 2 is 9, and a reservation indicator field configured by the vehicle 2 according to the reservation duration is 9, it indicates that the vehicle 2 expects to reserve the resource block #2 for nine periods. In addition, after separately configuring the reservation indicator fields, the vehicle 1 and the vehicle 2 may add the configured reservation indicator fields to MAC PDUs, and broadcast the MAC PDUs to a surrounding vehicle by using the resource block #2.

A vehicle around the vehicle 1 and the vehicle 2, for example, the vehicle 3, selects, by means of random selection according to the obtained information about the contention resource pool, the resource block #4 for sending data, and it is assumed that no other vehicle contends with the vehicle 3 for a resource (therefore, the data sent by the vehicle 3 can be successfully received by the vehicle 1 and the vehicle 2). Assuming that reservation duration determined by the vehicle 3 is 5, and a reservation indicator field configured by the vehicle 3 according to the reservation duration is 5, it indicates that the vehicle 3 expects to reserve the resource block #4 for five periods. In addition, the vehicle 3 generates a resource feedback field 000 according to resource feedback information before sending a MAC PDU (it is assumed that information that carries a resource feedback field length is 3 bits, the 3 bits respectively indicate, from left to right, reservation statuses of three resource blocks preceding the current resource block #4: the resource block #1, the resource block #2, and the resource block #3, 1 indicates successful reservation, and 0 indicates unsuccessful reservation). Reservation statuses of the resource block #1 and the resource block #3 are set to 0 because the resource block #1 and the resource block #3 are not used by a vehicle to send information. The vehicle 1 and the vehicle 2 are adjacent to each other and use a same time-frequency resource, that is, the resource block #2, to send data. Therefore, transmission resource collision is caused. In this case, the vehicle 3 cannot successfully receive data although the vehicle 3 can detect energy on the resource block #2. Therefore, a reservation status of the resource block #2 is also set to 0. In addition, after configuring the reservation indicator field and the resource feedback field, the vehicle 3 may add the configured reservation indicator field and resource feedback field to the MAC PDU, and broadcast the MAC PDU to a surrounding vehicle by using the resource block #4.

Then, the vehicle 1 and the vehicle 2 may successfully receive the MAC PDU of the vehicle 3; and determine, according to the resource feedback field carried in the received MAC PDU of the vehicle 3, that the MAC PDUs sent by the vehicle 1 and the vehicle 2 are not successfully received by a surrounding vehicle, that is, determine that the resource block #2 is not successfully reserved. In this case, the vehicle 1 and the vehicle 2 may separately determine, from the contention resource pool according to the reservation indicator field carried in the MAC PDU of the vehicle 3, a new resource block used to send a new MAC PDU. For example, the vehicle 1 determines, according to the reservation indicator field carried in the MAC PDU of the vehicle 3, that the new resource block is the resource block #1.

In addition, it is assumed that a vehicle around the vehicle 3, for example, the vehicle 4, determines, by keeping receiving a MAC PDU of a surrounding vehicle, that only the resource block #4 is successfully reserved. In this case, the vehicle 4 selects, according to the obtained information about the contention resource pool, the resource block #7 for sending data, and it is assumed that no other vehicle contends with the vehicle 4 for a resource (therefore, the data sent by the vehicle 4 can be successfully received by the vehicle 3). Assuming that reservation duration determined by the vehicle 4 is 9, and a reservation indicator field configured by the vehicle 4 according to the reservation duration is 9, it indicates that the vehicle 4 expects to reserve the resource block #7 for nine periods. In addition, the vehicle 4 generates a resource feedback field 100 according to resource feedback information before sending a MAC PDU. The 3 bits 100 respectively indicate, from left to right, reservation statuses of three resource blocks preceding the current resource block #7: the resource block #4, the resource block #5, and the resource block #6. The resource block #4 is successfully reserved. In addition, after configuring the reservation indicator field and the resource feedback field, the vehicle 4 may add the configured reservation indicator field and resource feedback field to the MAC PDU, and broadcast the MAC PDU to a surrounding vehicle by using the resource block #7.

Then, after successfully receiving the MAC PDU of the vehicle 4, the vehicle 3 determines, according to the resource feedback field carried in the received MAC PDU of the vehicle 4, that the MAC PDU sent by the vehicle 3 is successfully received by a surrounding vehicle, that is, determines that the resource block #4 is successfully reserved. In this case, the vehicle 3 may determine that the resource block #4 is a resource block used to send a new MAC PDU, until a reservation time ends or a third party determines that the resource block #4 is not successfully reserved.

According to the data transmission method provided in this embodiment of the present invention, the first terminal device sends, by using the first resource block, the first MAC PDU that carries the first reservation indicator field used to instruct to reserve the first resource block; then, after receiving the second MAC PDU that is sent by the set of second terminal devices by using the second resource block and that carries the first resource feedback field used to indicate that the first resource block is successfully reserved, determines, according to the first resource feedback field carried in the second MAC PDU sent by the second terminal device in the set of second terminal devices, that the first resource block is the resource block used to send the new MAC PDU; and sends the new MAC PDU by using the first resource block. When reserving the first resource block according to an instruction of the first reservation indicator field, and determining, according to a resource feedback field carried in a received MAC PDU sent by another terminal device, that the first resource block is successfully reserved, that is, no resource collision occurs, the first terminal device continues to use the first resource block to transmit the new MAC PDU; or when determining, according to a resource feedback field carried in a received MAC PDU sent by another terminal device, that the first resource block is not successfully reserved, that is, resource collision occurs, the first terminal device reselects a new resource block to transmit the new MAC PDU. Therefore, a transmission resource collision rate is effectively reduced, and transmission efficiency is improved.

In addition, the first resource block is reserved by using the duration that is determined according to the reservation indication information in the configuration information and in which the first terminal device may reserve the first resource block, so that a terminal device is prevented from keeping using a particular resource block, and network resources are allocated fairly.

Figure 17:
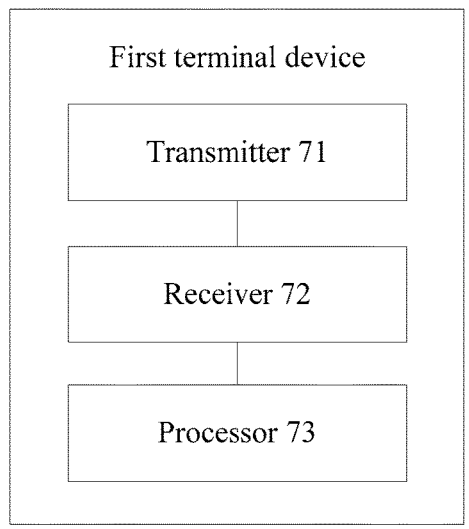
FIG. 17 is a schematic composition diagram of a first terminal device according to another embodiment of the present invention.

Another embodiment of the present invention provides a first terminal device. As shown in FIG. 17, the first terminal device includes a transmitter 71, a receiver 72, and a processor 73.

The transmitter 71 is configured to send a first Media Access Control MAC protocol data unit PDU by using a first resource block, where the first MAC PDU carries a first reservation indicator field, so as to instruct the first terminal device to reserve the first resource block.

The receiver 72 is configured to receive a second MAC PDU sent by using a second resource block by a set of second terminal devices, where the set of second terminal devices includes at least one second terminal device, and the second MAC PDU carries a first resource feedback field, so as to indicate that the first resource block is successfully reserved.

The processor 73 is configured to determine, according to the first resource feedback field that is received by the receiver 72 and that is sent by the second terminal device in the set of second terminal devices, that the first resource block used by the transmitter 71 to send the first MAC PDU is a resource block used to send a new MAC PDU.

The transmitter 71 is further configured to send the new MAC PDU by using the first resource block determined by the processor 73.

In this embodiment of the present invention, further, the second MAC PDU received by the receiver 72 further carries a second reservation indicator field, so as to instruct the second terminal device to reserve the second resource block.

In this embodiment of the present invention, further, the first resource feedback field carried in the second MAC PDU received by the receiver 72 is used to indicate that the first resource block is not successfully reserved.

The processor 73 is further configured to determine, from a contention resource pool according to the first resource feedback field and the second reservation indicator field that are received by the receiver 72, a new resource block as the resource block used to send the new MAC PDU, where the first resource feedback field is sent by the second terminal device in the set of second terminal devices, and the second reservation indicator field is sent by all the second terminal devices in the set of second terminal devices.

The transmitter 71 is further configured to send the new MAC PDU by using the new resource block determined by the processor 73.

In this embodiment of the present invention, further, the processor 73 is further configured to obtain configuration information before the transmitter 71 sends the first Media Access Control MAC protocol data unit PDU by using the first resource block, where the configuration information includes reservation indication information.

The processor 73 is further configured to determine a timing time of a timer according to the reservation indication information obtained by the processor 73, where the timing time is duration in which the first terminal device reserves the first resource block.

The processor 73 is further configured to start the timer when the transmitter 71 sends the first MAC PDU by using the first resource block.

The processor 73 is specifically configured to: when the timer started by the processor 73 does not stop timing, determine, according to the first resource feedback field that is received by the receiver 72 and that is sent by the second terminal device in the set of second terminal devices, that the first resource block used by the transmitter 71 to send the first MAC PDU is the resource block used to send the new MAC PDU.

In this embodiment of the present invention, further, the processor 73 is specifically configured to: when the timer started by the processor 73 stops timing, determine, from a contention resource pool according to the first resource feedback field and the second reservation indicator field that are received by the receiver 72, a new resource block as the resource block used to send the new MAC PDU, where the first resource feedback field is sent by the second terminal device in the set of second terminal devices, and the second reservation indicator field is sent by all the second terminal devices in the set of second terminal devices.

In this embodiment of the present invention, further, the processor 73 is further configured to obtain configuration information before the transmitter 71 sends the first Media Access Control MAC protocol data unit PDU by using the first resource block, where the configuration information includes reservation indication information.

The processor 73 is further configured to determine a timing time of a timer according to the reservation indication information obtained by the processor 73, where the timing time is duration in which the first terminal device reserves the first resource block.

The processor 73 is further configured to start the timer when the transmitter 71 sends the first MAC PDU by using the first resource block.

The processor 73 is specifically configured to: when the timer started by the processor 73 stops timing or when the timer started by the processor 73 does not stop timing, determine, from the contention resource pool according to the first resource feedback field and the second reservation indicator field that are received by the receiver 72, the new resource block as the resource block used to send the new MAC PDU, where the first resource feedback field is sent by the second terminal device in the set of second terminal devices, and the second reservation indicator field is sent by all the second terminal devices in the set of second terminal devices.

In this embodiment of the present invention, further, the reservation indication information obtained by the processor 73 includes reservation duration indication information, so as to indicate reservable duration or a reservable duration range.

The processor 73 is specifically configured to: when the reservation duration indication information obtained by the processor 73 is used to indicate the reservable duration, determine, according to the reservation duration indication information obtained by the processor 73, that the reservable duration is the timing time of the timer; or when the reservation duration indication information obtained by the processor 73 is used to indicate the reservable duration range, determine, according to the reservation duration indication information obtained by the processor 73, that any duration within the reservable duration range is the timing time of the timer.

In this embodiment of the present invention, further, the processor 73 is further configured to obtain configuration information before the transmitter 71 sends the first Media Access Control MAC protocol data unit PDU by using the first resource block, where the configuration information includes reservation indication information.

The processor 73 is further configured to determine reservation duration according to the reservation indication information obtained by the processor 73, where the reservation duration is duration in which the first terminal device reserves the first resource block.

The first reservation indicator field carried in the first MAC PDU sent by the transmitter 71 is further used to indicate a time parameter, the time parameter is greater than or equal to 0, and the time parameter is used to indicate the reservation duration.

The processor 73 is specifically configured to: when the time parameter is not 0, determine, according to the first resource feedback field that is received by the receiver 72 and that is sent by the second terminal device in the set of second terminal devices, that the first resource block used by the transmitter 71 to send the first MAC PDU is the resource block used to send the new MAC PDU.

In this embodiment of the present invention, further, the processor 73 is specifically configured to: when the time parameter is 0, determine, from a contention resource pool according to the first resource feedback field and the second reservation indicator field that are received by the receiver 72, a new resource block as the resource block used to send the new MAC PDU, where the first resource feedback field is sent by the second terminal device in the set of second terminal devices, and the second reservation indicator field is sent by all the second terminal devices in the set of second terminal devices.

In this embodiment of the present invention, further, the processor 73 is further configured to obtain configuration information before the transmitter 71 sends the first Media Access Control MAC protocol data unit PDU by using the first resource block, where the configuration information includes reservation indication information.

The processor 73 is further configured to determine reservation duration according to the reservation indication information obtained by the processor 73, where the reservation duration is duration in which the first terminal device reserves the first resource block.

The first reservation indicator field carried in the first MAC PDU sent by the transmitter 71 is further used to indicate a time parameter, the time parameter is greater than or equal to 0, and the time parameter is used to indicate the reservation duration.

The processor 73 is specifically configured to: when the time parameter is 0 or when the time parameter is not 0, determine, from the contention resource pool according to the first resource feedback field and the second reservation indicator field that are received by the receiver 72, the new resource block as the resource block used to send the new MAC PDU, where the first resource feedback field is sent by the second terminal device in the set of second terminal devices, and the second reservation indicator field is sent by all the second terminal devices in the set of second terminal devices.

In this embodiment of the present invention, further, the processor 73 is further configured to configure, according to the reservation duration determined by the processor 73, the first reservation indicator field before the transmitter 71 sends the first Media Access Control MAC protocol data unit PDU by using the first resource block.

In this embodiment of the present invention, further, the reservation indication information obtained by the processor 73 includes reservation duration indication information, so as to indicate reservable duration or a reservable duration range; or the reservation indication information obtained by the processor 73 includes the reservation duration indication information and information that carries a reservation indicator field length.

The processor 73 is specifically configured to: if the reservation indication information obtained by the processor 73 includes the reservation duration indication information and the reservation duration indication information is used to indicate the reservable duration, determine, according to the reservation duration indication information obtained by the processor 73, that the reservable duration is the reservation duration; or if the reservation indication information obtained by the processor 73 includes the reservation duration indication information and the reservation duration indication information is used to indicate the reservable duration range, determine, according to the reservation duration indication information obtained by the processor 73, that any duration within the reservable duration range is the reservation duration; or if the reservation indication information obtained by the processor 73 includes the reservation duration indication information and the information that carries the reservation indicator field length, determine the reservation duration according to the reservation duration indication information and the information that carries the reservation indicator field length that are obtained by the processor 73.

In this embodiment of the present invention, further, the processor 73 is further configured to monitor the contention resource pool before the transmitter 71 sends the first Media Access Control MAC protocol data unit PDU by using the first resource block.

The processor 73 is further configured to determine a second resource feedback field according to a reservation status that is of a resource block in the contention resource pool and that is obtained by the processor 73 by means of monitoring, where the second resource feedback field is used to indicate the reservation status of the resource block in the contention resource pool before the first MAC PDU is sent.

The first MAC PDU sent by the transmitter 71 by using the first resource block further carries the second resource feedback field.

In this embodiment of the present invention, further, the configuration information obtained by the processor 73 further includes resource feedback information.

The processor 73 is specifically configured to generate the second resource feedback field according to the resource feedback information obtained by the processor 73 and the reservation status that is of the resource block in the contention resource pool and that is obtained by the processor 73 by means of monitoring.

In this embodiment of the present invention, further, the resource feedback information obtained by the processor 73 includes information about a condition for carrying a resource feedback field and/or information that carries a resource feedback field length.

The processor 73 is specifically configured to: when the resource feedback information obtained by the processor 73 includes the information about the condition for carrying a resource feedback field, when it is determined that the information that is about the condition for carrying a resource feedback field and that is obtained by the processor 73 is met, generate the second resource feedback field according to preset information that carries a resource feedback field length and according to the reservation status that is of the resource block in the contention resource pool and that is obtained by the processor 73 by means of monitoring; or when the resource feedback information obtained by the processor 73 includes the information that carries the resource feedback field length, generate the second resource feedback field according to the information that carries the resource feedback field length and that is included in the resource feedback information obtained by the processor 73 and according to the reservation status that is of the resource block in the contention resource pool and that is obtained by the processor 73 by means of monitoring; or when the resource feedback information obtained by the processor 73 includes the information about the condition for carrying a resource feedback field and the information that carries the resource feedback field length, when it is determined that the information that is about the condition for carrying a resource feedback field and that is obtained by the processor 73 is met, generate the second resource feedback field according to the information that carries the resource feedback field length and that is included in the resource feedback information obtained by the processor 73 and according to the reservation status that is of the resource block in the contention resource pool and that is obtained by the processor 73 by means of monitoring.

In this embodiment of the present invention, further, the processor 73 is specifically configured to obtain the preconfigured configuration information.

Alternatively, the receiver 72 is further configured to receive the configuration information sent by a network device.

In this embodiment of the present invention, further, the first reservation indicator field is included in a MAC header of the first MAC PDU sent by the transmitter 71. The MAC header further includes an extension indicator field, so as to indicate whether the first MAC PDU carries the second resource feedback field, and when the extension indicator field indicates that the first MAC PDU carries the second resource feedback field, the second resource feedback field is included in the MAC header of the first MAC PDU sent by the transmitter 71.

In this embodiment of the present invention, further, when the first MAC PDU sent by the transmitter 71 carries the first reservation indicator field, the first reservation indicator field is included in a payload field of the first MAC PDU sent by the transmitter 71, and a MAC header of the first MAC PDU sent by the transmitter 71 includes a MAC subheader, so as to indicate that data corresponding to the MAC subheader is the first reservation indicator field; or when the first MAC PDU sent by the transmitter 71 carries the first reservation indicator field and the second resource feedback field, the first reservation indicator field and the second resource feedback field are included in a payload field of the first MAC PDU sent by the transmitter 71, and a MAC header of the first MAC PDU sent by the transmitter 71 includes a MAC subheader, so as to indicate that data corresponding to the MAC subheader is the first reservation indicator field and the second resource feedback field.

It should be noted that for specific working processes of functional modules in the first terminal device provided in this embodiment of the present invention, reference may be made to specific descriptions of corresponding processes in method embodiments, and details are not described herein again in this embodiment of the present invention.

The first terminal device provided in this embodiment of the present invention sends, by using the first resource block, the first MAC PDU that carries the first reservation indicator field used to instruct to reserve the first resource block; then, after receiving the second MAC PDU that is sent by the set of second terminal devices by using the second resource block and that carries the first resource feedback field used to indicate that the first resource block is successfully reserved, determines, according to the first resource feedback field carried in the second MAC PDU sent by the second terminal device in the set of second terminal devices, that the first resource block is the resource block used to send the new MAC PDU; and sends the new MAC PDU by using the first resource block. When reserving the first resource block according to an instruction of the first reservation indicator field, and determining, according to a resource feedback field carried in a received MAC PDU sent by another terminal device, that the first resource block is successfully reserved, that is, no resource collision occurs, the first terminal device continues to use the first resource block to transmit the new MAC PDU; or when determining, according to a resource feedback field carried in a received MAC PDU sent by another terminal device, that the first resource block is not successfully reserved, that is, resource collision occurs, the first terminal device reselects a new resource block to transmit the new MAC PDU. Therefore, a transmission resource collision rate is effectively reduced, and transmission efficiency is improved.

In addition, the first resource block is reserved by using the duration that is determined according to the reservation indication information in the configuration information and in which the first terminal device may reserve the first resource block, so that a terminal device is prevented from keeping using a particular resource block, and network resources are allocated fairly.

Figure 18:
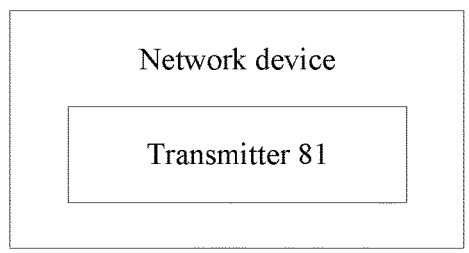
FIG. 18 is a schematic composition diagram of a network device according to another embodiment of the present invention.

Another embodiment of the present invention provides a network device. As shown in FIG. 18, the network device may include a transmitter 81.

The transmitter 81 is configured to send configuration information to a first terminal device, where the configuration information includes reservation indication information.

In this embodiment of the present invention, further, the reservation indication information sent by the transmitter 81 includes reservation duration indication information, so as to indicate reservable duration or a reservable duration range; or the reservation indication information sent by the transmitter 81 includes the reservation duration indication information and information that carries a reservation indicator field length.

In this embodiment of the present invention, further, the configuration information sent by the transmitter 81 further includes resource feedback information, and the resource feedback information includes information about a condition for carrying a resource feedback field and/or information that carries a resource feedback field length.

In this embodiment of the present invention, further, the transmitter 81 is specifically configured to send the configuration information to the first terminal device by using system information or radio resource control RRC signaling.

In this embodiment of the present invention, further, the configuration information sent by the transmitter 81 further includes information about a contention resource pool.

It should be noted that for specific working processes of functional modules in the network device provided in this embodiment of the present invention, reference may be made to specific descriptions of corresponding processes in method embodiments, and details are not described herein again in this embodiment of the present invention.

The network device provided in this embodiment of the present invention sends the configuration information that includes the reservation indication information to the first terminal device. Therefore, the first terminal device may reserve the first resource block according to the duration that is determined according to the reservation indication information and in which the first resource block may be reserved, so that a terminal device is prevented from keeping using a particular resource block, and network resources are allocated fairly.

According to the foregoing descriptions about implementations, a person skilled in the art may clearly understand that, for the purpose of convenient and brief description, division of the foregoing functional modules is used as an example for illustration. In actual application, the foregoing functions may be allocated to different functional modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separated, and parts shown as units may be one or more physical units, may be located in one place, or may be distributed in different places. Some or all of the units may be selected according to actual requirements to achieve the objectives of the solutions of the embodiments.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the present invention essentially, or the part contributing to the conventional art, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in the embodiments of the present invention. The foregoing storage medium includes: any medium that can store program code, such as a USB flash drive, a removable hard disk, a read-only memory (ROM for short), a random access memory (RAM for short), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A first terminal device, comprising a processor and a non-transitory computer readable medium storing executable instructions, wherein executing the instructions by the processor facilitates performing steps comprising:

sending a first Media Access Control (MAC) protocol data unit (PDU) via a first resource block, wherein the first MAC PDU carries a first reservation indicator field indicating that the first terminal device expects to reserve the first resource block;

receiving, from a set of second terminal devices, a second MAC PDU via a second resource block, wherein the set of second terminal devices comprises at least one second terminal device, the second MAC PDU carries a first resource feedback field for indicating whether the first resource block is successfully reserved, and the second MAC PDU further carries a second reservation indicator field for indicating that the at least one second terminal device expects to reserve the second resource block;

determining, according to the first resource feedback field indicating that the first resource block is successfully reserved, that the first resource block is a resource block for sending a new MAC PDU; and sending the new MAC PDU via the first resource block.

2. The first terminal device according to claim 1, wherein the first resource feedback field carried in the second MAC PDU indicates that the first resource block is not successfully reserved, and wherein executing the instructions further facilitates performing steps comprising:

determining, from a contention resource pool according to the first resource feedback field and the second reservation indicator field, a new resource block as the resource block for sending the new MAC PDU; and sending the new MAC PDU via the new resource block.

3. The first terminal device according to claim 1, wherein executing the instructions further facilitates performing steps comprising:

obtaining configuration information before sending the first MAC PDU via the first resource block, wherein the configuration information comprises reservation indication information;

determining a timing time of a timer according to the reservation indication information, wherein the timing time is duration in which the first terminal device reserves the first resource block;

starting the timer when sending the first MAC PDU via the first resource block; and when the timer started does not stop timing, determining, according to the first resource feedback field, that the first resource block used to send the first MAC PDU is the resource block used to send the new MAC PDU.

4. The first terminal device according to claim 2, wherein executing the instructions further facilitate performing:

obtaining configuration information before sending the first MAC PDU via the first resource block, wherein the configuration information comprises reservation indication information;

determining a timing time of a timer according to the reservation indication information, wherein the timing time is duration in which the first terminal device reserves the first resource block;

starting the timer when sending the first MAC PDU via the first resource block; and when the timer started stops timing or when the timer does not stop timing, determine, from the contention resource pool according to the first resource feedback field and the second reservation indicator field, the new resource block as the resource block used to send the new MAC PDU, wherein the second reservation indicator field is received from all second terminal devices in the set of second terminal devices.

5. The first terminal device according to claim 3, wherein executing the instructions further facilitate performing steps comprising:

when the timer stops timing, determining, from a contention resource pool according to the first resource feedback field and the second reservation indicator field, a new resource block as the resource block used to send the new MAC PDU, wherein the second reservation indicator field is received from all second terminal devices in the set of second terminal devices.

6. The first terminal device according to claim 3, wherein the reservation indication information comprises reservation duration indication information for indicating reservable duration or a reservable duration range, and wherein executing the instructions further facilitate performing steps comprising:

when the reservation duration indication information indicates the reservable duration, determining, according to the reservation duration indication information, that the reservable duration is the timing time of the timer; and when the reservation duration indication information indicates the reservable duration range, determining, according to the reservation duration indication information, that any duration within the reservable duration range is the timing time of the timer.

7. A data transmission method performed by a first terminal device, the method comprising:

sending a first Media Access Control (MAC) protocol data unit (PDU) via a first resource block, wherein the first MAC PDU carries a first reservation indicator field indicating that the first terminal device expects to reserve the first resource block;

receiving from a set of second terminal devices, a second MAC PDU via a second resource block, wherein the set of second terminal devices comprises at least one second terminal device, the second MAC PDU carries a first resource feedback field for indicating whether the first resource block is successfully reserved, and the second MAC PDU further carries a second reservation indicator field for indicating that the at least one second terminal device expects to reserve the second resource block;

determining, according to the first resource feedback field indicating that the first resource block is successfully reserved, that the first resource block is a resource block for sending a new MAC PDU; and sending the new MAC PDU via the first resource block.

8. The method according to claim 7, wherein the first resource feedback field indicates that the first resource block is not successfully reserved, and the method further comprises:

determining, from a contention resource pool according to the first resource feedback field and the second reservation indicator field, a new resource block as the resource block for sending the new MAC PDU, wherein the second reservation indicator field is received from all second terminal devices in the set of second terminal devices; and sending the new MAC PDU via the new resource block.

9. The method according to claim 8, wherein before the sending the first MAC PDU, the method further comprises:

obtaining configuration information comprising reservation indication information;

determining a timing time of a timer according to the reservation indication information, wherein the timing time is duration in which the first terminal device reserves the first resource block; and starting the timer when sending the first MAC PDU via the first resource block; and wherein determining the new resource block as the resource block for sending the new MAC PDU comprises:

when the timer stops timing or when the timer does not stop timing, determining, from the contention resource pool according to the first resource feedback field and the second reservation indicator field, the new resource block as the resource block used to send the new MAC PDU, wherein the second reservation indicator field is received from all second terminal devices in the set of second terminal devices.

10. The method according to claim 8, wherein the reservation indication information comprises reservation duration indication information for indicating reservable duration or a reservable duration range and wherein determining the timing time of the timer according to the reservation indication information comprises:

when the reservation duration indication information indicates the reservable duration, determining, according to the reservation duration indication information, that the reservable duration is the timing time of the timer; and when the reservation duration indication information indicates the reservable duration range, determining, by the first terminal device according to the reservation duration indication information, that any duration within the reservable duration range is the timing time of the timer.

11. The method according to claim 7, wherein before the sending the first MAC PDU, the method further comprises:

obtaining configuration information comprising reservation indication information;

determining a timing time of a timer according to the reservation indication information, wherein the timing time is duration in which the first terminal device reserves the first resource block; and starting, by the first terminal device, the timer when the first terminal device sends the first MAC PDU via the first resource block; and wherein determining that the first resource block is the resource block for sending the new MAC PDU comprises:

when the timer does not stop timing, determining, according to the first resource feedback field, that the first resource block is the resource block used to send the new MAC PDU.

12. The method according to claim 11, further comprising:

when the timer stops timing, determining, from a contention resource pool according to the first resource feedback field and the second reservation indicator field, a new resource block as the resource block used to send the new MAC PDU, wherein the second reservation indicator field is received from all second terminal devices in the set of second terminal devices.

\* \* \* \* \*